(12) United States Patent
Fujimoto et al.

(10) Patent No.: US 7,315,009 B2
(45) Date of Patent: Jan. 1, 2008

(54) MATERIAL FOR WELDING AND WELDED ARTICLE

(75) Inventors: Hiroki Fujimoto, Toyota (JP); Masahiro Nakata, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 11/331,107

(22) Filed: Jan. 13, 2006

(65) Prior Publication Data

US 2006/0175310 A1    Aug. 10, 2006

Related U.S. Application Data

(60) Division of application No. 11/019,245, filed on Dec. 23, 2004, which is a continuation of application No. PCT/JP03/08078, filed on Jun. 26, 2003.

(30) Foreign Application Priority Data

Jun. 27, 2002    (JP) ............................. 2002-188128

(51) Int. Cl.
  *B23K 26/00* (2006.01)
  *B23K 9/00* (2006.01)
  *B23K 15/00* (2006.01)

(52) U.S. Cl. ..................... 219/121.64; 219/121.36; 219/121.11

(58) Field of Classification Search ........... 219/121.64, 219/121.11, 121.13, 121.14, 121.36, 121.45, 219/121.46, 121.63; 72/374; 228/173.1–173.6
See application file for complete search history.

(56) References Cited

U.S. PATENT DOCUMENTS 2,878,552 A * 3/1959 Wirt ........................ 428/594
4,627,565 A * 12/1986 Lomerson ................... 228/107
5,104,032 A    4/1992 Spies et al.
5,476,210 A * 12/1995 Hodozuka et al. ........... 228/165
5,626,776 A *  5/1997 Morris, Jr. ............... 219/121.64
6,977,355 B2 * 12/2005 Duley et al. ............ 219/121.64
7,150,391 B2 * 12/2006 Fujimoto et al. ........... 228/252
2001/0047983 A1   12/2001 Degawa et al.

FOREIGN PATENT DOCUMENTS

JP          56062688         5/1981

(Continued)

*Primary Examiner*—Jonathan Johnson
*Assistant Examiner*—Rachel E. Beveridge
(74) *Attorney, Agent, or Firm*—Clark & Brody

(57) ABSTRACT

A material for welding 5 having a region 11 in which welding such as laser welding or arc welding is performed, the region including indentations 5a-1 which are produced by carrying out a first working step comprising embossing, V-bending, U-bending, L-bending, drawing, stepped drawing, or a combination of these to form a curved portion 5a in the material being worked, and a second working step which is press working which crushes the curved portion 5a which is formed by the first working step. The indentations 5a-1 have a protruded portion 11a which projects from a flat surface which forms the surface of the material being worked 5, and a recessed portion 11b which is formed on the inside of the protruded portion 11. Indentations 5a-1 are provided in the form of at least two separated dots so as to be generally parallel to the predicted welding position and are arranged on the expected welding position.

10 Claims, 20 Drawing Sheets

FOREIGN PATENT DOCUMENTS

| | | | |
|---|---|---|---|
| JP | 03-193285 | | 8/1991 |
| JP | 10-216974 | | 8/1998 |
| JP | 10216974 A | * | 8/1998 |
| JP | 11-047967 | | 2/1999 |
| JP | 2001-162388 | | 6/2001 |
| JP | 2001-162391 | | 6/2001 |
| JP | 2001162391 A | * | 6/2001 |

* cited by examiner

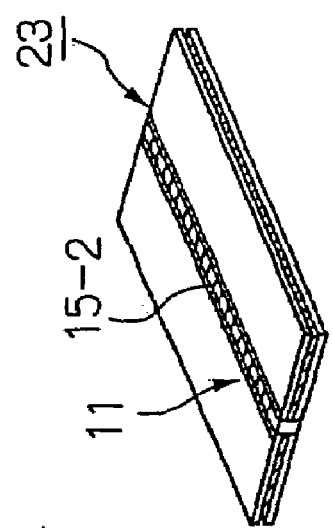
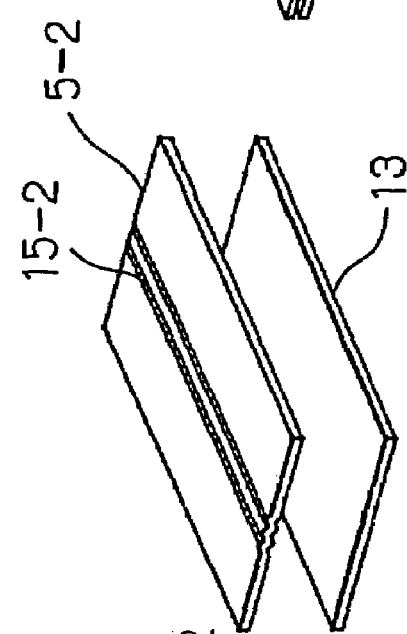
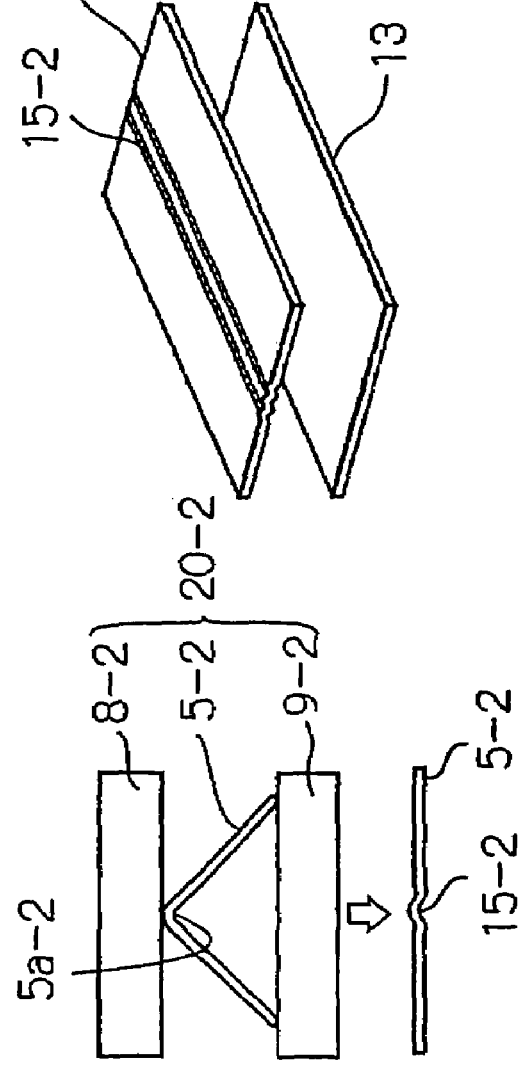

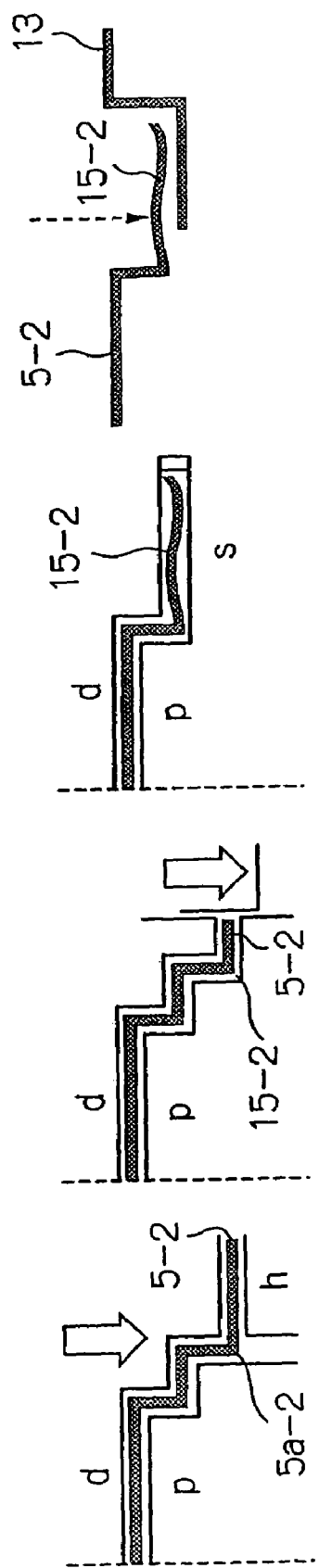

MATERIAL FOR WELDING AND WELDED ARTICLE

This is a divisional of U.S. patent application Ser. No. 11/019,245 filed Dec. 23, 2004, which is a continuation of International Patent Application No. PCT/JP03/08078, filed Jun. 26, 2003. The PCT application was not in English as published under PCT Article 21(2).

TECHNICAL FIELD

This invention relates to a material for welding and a welded article. This invention relates, for example, to a material for laser welding, a laser welded article, and an automobile body.

BACKGROUND ART

Zinc-based plated steel sheet such as galvannealed steel sheet and hot-dip galvanized steel sheet has excellent corrosion resistance. For this reason, zinc-based plated steel sheet is used in a wide range of applications including steel sheet for automobile bodies, steel sheet for household appliances, steel sheet for industrial machines, steel sheet for furniture, and steel sheet for building materials. Zinc-based plated steel sheet is typically formed into a product such as an automobile body by the following steps (a)-(d).

(a) The plated steel sheet is formed into a prescribed shape by subjecting to press forming, for example, (b) The outer periphery of the formed member is superimposed on a second member to which it is to be welded, and the two members are secured to each other in this state.

(c) The two members are welded by resistance welding such as spot welding or seam welding, TIG welding, MIG welding, or plasma arc welding in which the portion where the first member is superimposed on the second member becomes a weld zone. As is well known, particularly in the case of an automobile body, spot welding is frequently used as a welding method.

(d) Welding is repeatedly carried out in this manner.

Laser welding using a laser beam has attracted attention as a welding technique for zinc-based plated steel sheet. FIG. 39(a) FIG. 39(b) are explanatory views showing the manufacture of a laminated steel sheet 2 formed from zinc-based plated steel sheets 1. As shown in FIG. 39(a), two zinc-based plated steel sheets 1, 1 are superimposed and secured to each other. Then, as shown in FIG. 39(b), laser welding is performed on the two zinc-based plated steel sheets 1, 1 to form a weld 2a, thereby manufacturing a laminated steel sheet 2.

Each zinc-based plated steel sheet 1 has a plated coating formed on the surface thereof, the plated coating predominantly comprising zinc, which has a boiling point which is lower than the melting point of steel. Therefore, when laser welding is carried out, the zinc, which is the main component of the plated coating formed on the superimposed surfaces, is explosively vaporized by the input of heat during laser welding. Accordingly, when two zinc-based plated steel sheets 1 are simply superimposed and laser welding is carried out as shown in FIGS. 39(a) and 39(b), or when a zinc-based plated steel sheet 1 and an ordinary steel sheet are simply superimposed and laser welding is carried out, molten iron which is formed by the input of heat during laser welding is blown away by the zinc which explosively vaporizes, and weld defects are formed in the weld 2a.

In order to prevent the occurrence of such weld defects and obtain a good weld, inventions are known in which a gap having suitable dimensions through which zinc which is vaporized by the input of heat during laser welding can be discharged to the outside is provided in a location where a laser welding is to be performed on two superimposed steel sheets, at least one of which is a zinc-based plated steel sheet.

For example, in JP-A 10-216974, Japanese Patent No. 2,571,976, and in the publication: Nikkei Mechanical, Sep. 30, 1996, No. 490 and the like, inventions are disclosed in which projections are previously formed by press forming, for example, on a zinc-based plated steel sheet which is a material for laser welding, and laser welding is carried out while maintaining a gap of suitable dimensions between two superimposed steel sheets by means of the projections.

However, the suitable dimensions of this gap are extremely small, such as on the order of 0.05-0.3 mm for a zinc-based plated steel sheet with a thickness of 0.7 mm. Therefore, when carrying out the above-described prior art inventions, it is necessary to form these minute projections on either of the two steel sheets by press forming. For this purpose, it becomes necessary to carry out precision machining or hand finishing of the surface of the pressing dies elaborately. These operations become extremely difficult and entail large costs. In particular, there are many cases in which the surface to be welded of parts of automobile bodies made from zinc-based plated steel sheets are given a complicated, curved three-dimensional shape, so carrying out precision machining or hand finishing of a pressing die elaborately is actually impossible.

In addition, the outline of the ridgeline of the minute projections which are formed by press forming can easily become indistinct due to elastic recovery, which inevitably occurs in a formed article after press forming. Therefore, even if it is possible to carry out machining of a pressing die so as to provide desired minute projections, it is not easy to provide a press formed article with projections having the same shape as the projections of the die.

Furthermore, projections which are provided in a pressing die can easily change shape due to abrasion accompanying press working. Therefore, it is difficult to stably maintain a gap having suitable dimensions for laser welding over a long period.

In JP-A 2001-162388, an invention is disclosed in which projections which are overly tall with respect to the appropriate dimensions of a gap are previously formed on a steel sheet, and laser welding is carried out in the location of a suitable gap in a sloping region formed between the projections and the rod of a clamping apparatus. In that invention, the height of the projections is set to be larger than the actual target value, so the projections can be stably provided by machining.

In that invention, laser welding is carried out in the sloping region formed between the projections, which are set to have a large height, and a clamping rod. Therefore, if the position where laser welding is carried out even slightly moves in the horizontal direction, the size of the gap greatly varies. Accordingly, although projections can be stably formed in that invention, it is not possible to always keep the dimensions of a gap for laser welding sufficient to stably guarantee the quality of laser welding.

DISCLOSURE OF THE INVENTION

This invention was made in order to solve the above-described problems of the prior art, and its object is to provide a material for welding, a welded article, and an automobile body such as, for example, a material for laser welding, a laser welded article, and an automobile body, which can prevent the occurrence of weld defects and obtain a good weld with certainty.

The present inventors performed diligent studies in order to solve the above-described problems. As a result, they found that by utilizing a region having an indentation which is formed by performing a first working step to form a curved portion in a material being worked and then performing a second working step to compress the curved portion, the height of the indentation can be stably kept constant, the occurrence of weld defects arising from components such as zinc which induce weld defects can be prevented, and a good weld can be obtained with certainty. They found that the height of this indentation is preferably at least 0.02 mm and at most 1.0 mm.

Namely, the present invention is based on the novel and important finding that by not forming a gap for welding by use of a minutely formed projection as it is as in the prior art, but by forming a curved portion which is large enough to be stably formed by working and then compressing the curved portion to stably form an indentation having a desired height and using the indentation which is formed in this manner to guarantee a gap for welding, the occurrence of weld defects is prevented and good welds can be stably obtained with certainty on an industrial scale.

The present invention is a material for welding having a region for maintaining a gap of a prescribed size between it and another material for welding when it is superimposed on the other material for welding and welding is carried out, characterized in that the region is provided with an indentation which is formed by compressing a curved portion.

In a material for welding according to the present invention, examples of the shape of the indentation are a shape constituted by a protruded portion and a recessed portion formed on the interior of the protruded portion, and a shape constituted by a protruded portion.

In a material for welding according to the present invention, the height of the indentation is preferably at least 0.02 mm and at most 1.0 mm.

In a material for welding according to the present invention, examples of welding are laser welding, plasma welding, and arc welding.

These materials for welding according to the present invention are manufactured by forming a curved portion in a material being worked, and then compressing the curved portion.

From another standpoint, the present invention is a welded article obtained by superimposing two materials for welding, at least one of which is a zinc-based plated steel sheet, and carrying out welding, characterized in that at least one of the two materials for welding is the above-described material for welding according to the present invention, and the welding is carried out, after the two materials for welding are superimposed such that the indentation formed on the material for welding of the present invention is disposed between the two materials, in a region which maintains a gap providing a prescribed distance between the two materials for welding.

A welded article according to the present invention is manufactured by superimposing two materials for welding, at least one of which is a zinc-based plated steel sheet, and carrying out welding, at least one of the two materials for welding being the above-described material for welding according to the present invention, and the welding is carried out in a region in which a prescribed gap is guaranteed by the indentation by superimposing the two materials for welding with the indentation formed on the material for welding of the present invention disposed between them.

From another standpoint, the present invention is an automobile body characterized by comprising the above-described welded article according to the present invention.

BRIEF DESCRIPTION OF THE DRAWINGS

FIG. 27(a) is an explanatory view showing the second working step in a tenth embodiment, FIG. 27(b) is an explanatory view showing a zinc-based plated steel sheet having an indentation and a flat steel sheet which are welded in the tenth embodiment, and FIG. 27(c) is an explanatory view showing a laminated steel sheet obtained in the tenth embodiment.

FIGS. 29(a)-29(d) are explanatory views showing manufacturing steps performed on a steel sheet using stepped drawing and a welding step in the eleventh embodiment.

Figure 1A:
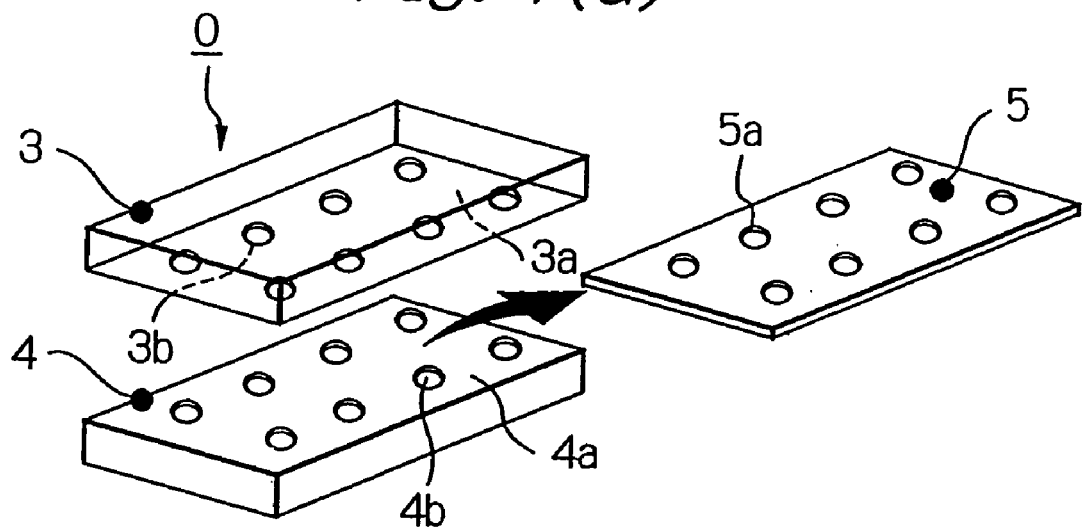
FIG. 1(a) is an explanatory view showing the main portions of an embossing apparatus for carrying out embossing in a first embodiment.

In each of the figures, reference number 5 indicates a material for welding, reference number 5a indicates a curved portion, reference number 5a-1 indicates an indentation, reference number 11 indicates a region, reference number 11a indicates a protruded portion, reference numbers 11a-1 and 11a-2 indicate peaks, and reference number 11b indicates a recessed portion.

DETAILED EXPLANATION OF THE INVENTION

First Embodiment

Below, embodiments of a material for welding, a welded article, and an automobile body according to the present invention will be explained in detail while referring to the attached drawings. In the following explanation, the case in which a metal plate which is a material to be worked is a zinc-based plated steel sheet which generates vaporized zinc, which is a component which leads to weld defects, due to the input of heat at the time of working, and the welding is laser welding will be taken as an example.

First, after explaining a method of manufacturing a material for laser welding and a material for laser welding of this embodiment, a laser welded article, a method for its manufacture, and an automobile body will be explained.

[Method of Manufacturing a Material for Laser Welding 12]

Figure 1B:
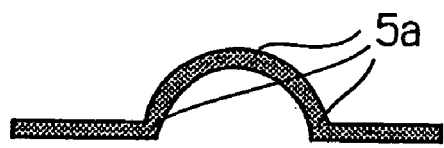
FIG. 1(b) is an enlarged view of a curved portion.

FIG. 1(a) is an explanatory view which shows the main portion of an embossing apparatus 0 for carrying out embossing in this embodiment. FIG. 1(b) is an enlarged view of a curved portion 5a.

As shown in FIG. 1(a), a curved portion 5a, which is an embossed portion, is formed by carrying out a first working step (embossing) on a material to be worked 5. For example, as shown in FIG. 1(b), in the case of an embossed shape, there is a curved portion 5a from the tip to the base of the embossed shape. This first working step will next be explained.

(1) First Working Step (Embossing)

In this embodiment, using the embossing apparatus 0, a material to be worked in the form of a zinc-based plated steel sheet 5 undergoes embossing as the first working step.

As shown in FIG. 1(a), this embossing apparatus 0 has an upper die 3 and a lower die 4 which face each other. A clamping surface 3a for clamping a flat zinc-based plated steel sheet 5 is provided on the upper die 3. As shown in the figure, a total of eight depressions 3b are provided on the clamping surface 3a in two rows.

A clamping surface 4a for clamping a zinc-based plated steel sheet 5 is also provided on the lower die 4. A total of eight projections 4b are provided in two rows on the clamping surface 4a opposing the eight depressions 3b provided on the upper die 3.

Figure 2:
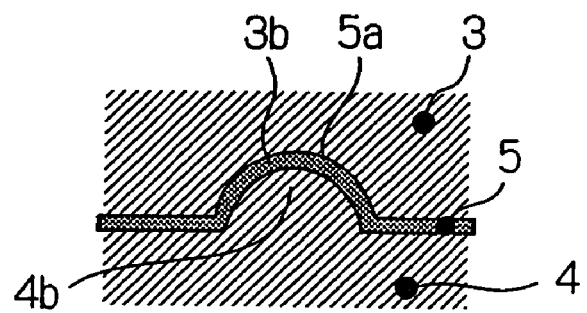
FIG. 2 is an enlarged cross-sectional view of a depression and a projection of dies in the first embodiment.

FIG. 2 is an enlarged cross-sectional view showing the depressions 3b and the projections 4b in this embodiment The projections 4b can be formed on the lower die 4 by any conventional means, such as by machining. In particular, when the shape of the tips of the embossed portions formed on the zinc-based plated steel sheet 5 is a relatively simple shape such as a circle or an ellipse as in this embodiment, the projections 4b can be formed by inserting pins having a tip with a round or elliptical shape into pin insertion holes provided in the surface of the lower die 4.

Figure 3:
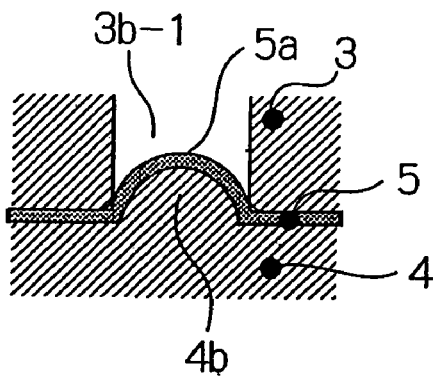
FIG. 3 is an enlarged cross-sectional view showing another example of the shape of a depression and a projection in the first embodiment.
Figure 4:
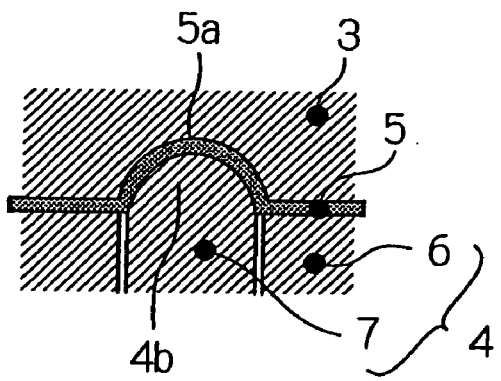
FIG. 4 is an enlarged cross-sectional view showing another example of the shape of a depression and a projection in the first embodiment.

FIG. 3 and FIG. 4 are enlarged cross-sectional views showing other examples of shapes of the depressions and the projections.

As shown in FIG. 3, the depressions 3b formed in the upper die 3 may have a shape which extends through the die to its upper end. With this shape, the man hours required for machining the die can be decreased. As shown in FIG. 4, the lower die 4 can be formed as a punch 7 and a separate holder 6, and in a state in which a zinc-based plated steel sheet 5 is restrained by the holder 6, a curved portion 5a can be formed by the projection 4b formed on the upper end of the punch 7. As a result, strains which can easily occur on the periphery of the resulting curved portion 5a can be suppressed.

In the above explanation, as shown in FIGS. 1-4, an example is given of a form of the invention in which projections 4b are provided on the lower die 4 and depressions 3b are provided on the upper die 3. However, the present invention is not limited to this form. For example, depressions may be provided on the lower die and projections may be provided on the upper die 3.

In the above explanation, as shown in FIGS. 1-4, an example is given of the case in which the zinc-based plated steel sheet 5 to be embossed is flat. However, a material to which the present invention is applied is not limited to a flat zinc-based plated steel sheet 5. For example, the present invention can be applied in the same manner to a curved zinc-based plated steel sheet 5 having a prescribed radius of curvature, such as a press formed steel sheet.

Furthermore, in this embodiment, an example is given of the case in which the projections 4b are made round so as to enable ease of machining. However, the present invention is not limited to this form, although it is preferable to give the projections 4b a circular shape.

Figure 5:
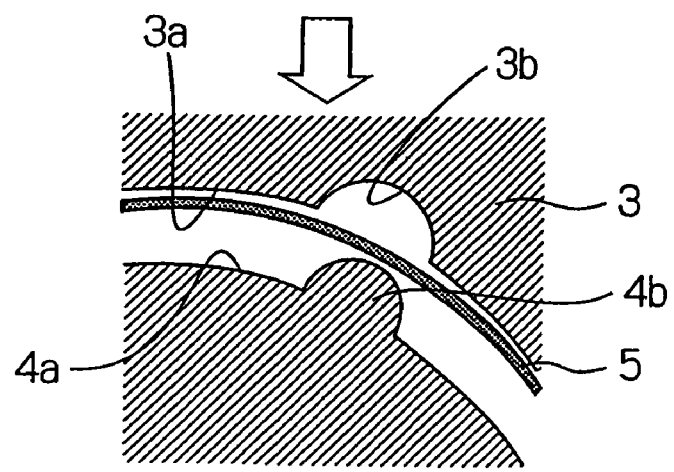
FIG. 5 is an explanatory view showing one example of press forming for the case in which clamping surfaces are curved in the first embodiment.

FIG. 5 is an explanatory view showing an example of the state at the time of press forming when the clamping surfaces 3a and 4a are curved. The direction of the arrow in FIG. 5 is the direction of pressing.

At the time of press working, particularly when the clamping surfaces 3a and 4a are curved as shown in FIG. 5, the shape of the projections 4b is preferably such as to not have a negative angle with respect to the direction of forming (the direction of movement of the upper die 3 and the lower die 4 at the time of press forming).

Figure 6:
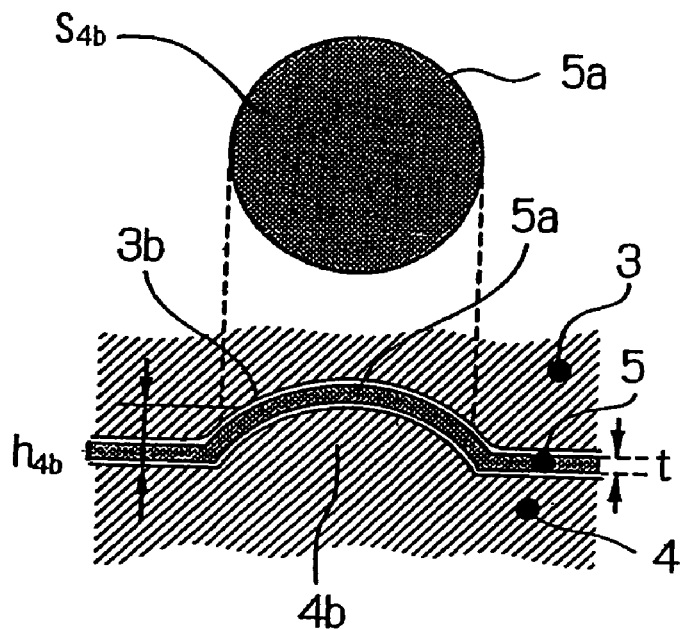
FIG. 6 is an explanatory view showing the state in which a curved portion is formed in the zinc-based plated steel sheet by a first working step.

FIG. 6 is an explanatory view showing the formation of a curved portion 5a in a zinc-based plated steel sheet 5 in the first working step.

It is not necessary to limit the height $h_{4b}$ of the projections 4b which are formed, or the projected area $S_{4b}$ of each projection 4b. However, in cases in which the height $h_{4b}$ of the projections 4b is too great with respect to the thickness t of the zinc-based plated steel sheet 5 or the projected area $S_{4b}$ of each projection 4b is too small with respect to the thickness t of the zinc-based plated steel sheet 5, cracks may form in the zinc-based plated steel sheet 5 at the time of forming the curved portions 5a. From this viewpoint, the height $h_{4b}$ of the projections 4b is preferably at most 10 times the thickness t of the zinc-based plated steel sheet 5, and the area $S_{4b}$ of each projection 4b is preferably at least the square of the thickness. On the other hand, if the height $h_{4b}$ of the projections 4b is too small, it becomes difficult to accurately transfer the shape of the projections 4b to the zinc-based plated steel sheet 5, so the height $h_{4b}$ of the projections 4b is preferably at least 0.5 times the thickness.

The projections 4b can be provided in any location which can guarantee a prescribed distance from the position where laser welding is expected to be carried out on the zinc-based plated steel sheet 5 (referred to below as the "predicted welding position"), and there is no particular restriction on their location. For example, in the vicinity of the predicted welding position, the projections 4b are preferably disposed generally parallel to the predicted welding position (see below-described FIG. 15), or they are preferably disposed so as to surround the predicted welding position, such as in parallel on the left and right of the predicted welding position (see below-described FIG. 13). In addition, when laser welding is carried out intermittently, the projections are preferably disposed between each weld bead (see FIG. 17).

If the distance from the positions in which the projections 4b are disposed to the predicted welding position is too great, the gap which is formed by the projections 4b can vary due to strains of the plate or the like, and it is no longer easy to stably maintain the size of the gaps formed by the projections 4b. Therefore, the distance from the positions where the projections 4b are formed to the predicted welding position is preferably set to be as small as possible. For example, the distance from the center of a projection 4b to the predicted welding position is preferably at most 60 mm.

The projections 4b are preferably formed by drawing so as not to increase the number of steps required to form a press formed article. However, when the weld is located in the flange surface of a press formed article and this surface is used as a blank holding surface, formation of the curved portion 5a by drawing is not possible, and it can be formed in a step after drawing.

Thus, in this embodiment, using an embossing apparatus 0 having an upper die 3 and a lower die 4, in a drawing step or the next step, curved portions having a convex shape are formed by the first working step in the vicinity of the predicted welding position of a zinc-based plated steel sheet 5. In other words, in this embodiment, using an embossing apparatus 0 having an upper die 3 and a lower die 4, in a drawing step or the next step, embossing of a zinc-based plated steel sheet 5 is carried out to form curved portions 5a.

(2) Second Working Step (Compressing the Curved Portion 5a by Press Working)

Figure 7:
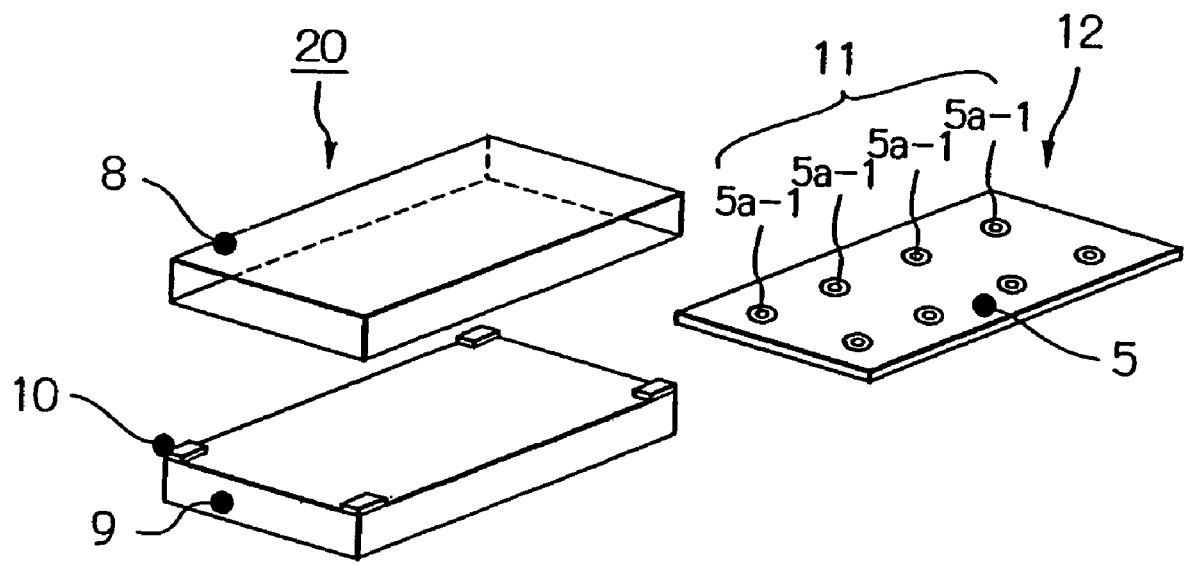
FIG. 7 is a perspective view showing the state during a second working step.
Figure 8:
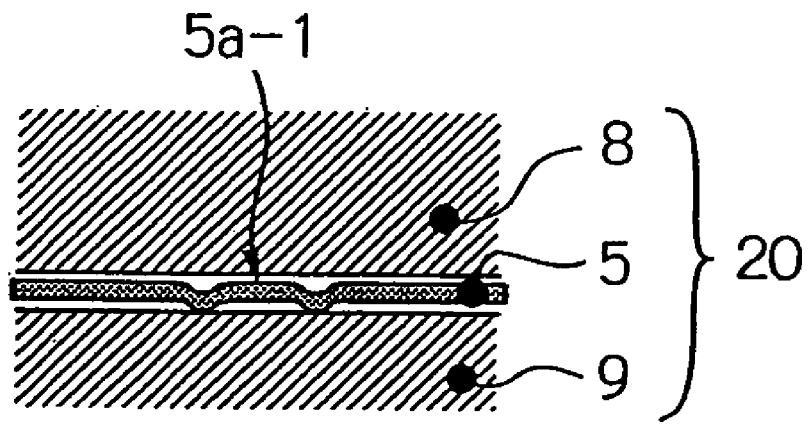
FIG. 8 is a cross-sectional view showing a press working apparatus at the time of the second working step.

FIG. 7 is a perspective view showing the state at the time of the second working step, and FIG. 8 is a cross-sectional view showing a press working apparatus 20 at the time of the second working step.

As shown in FIGS. 7 and 8, the second working step is carried out using the press working apparatus 20. As a result of the second working step, each curved portion 5a which is formed in the zinc-based plated steel sheet 5 by the first working step is compressed, and as a result, a region 11 having eight indentations 5a-1 is formed.

The press working apparatus 20 has an upper die 8 and a lower die 9 each having a flat or curved surface. In this embodiment, spacers 10 for maintaining a prescribed distance between the upper die 8 and lower die 9 are provided at the four corners of the lower die 9.

There is no particular restriction on the manner of installation of the spacers 10 on the lower die 9. For example, the spacers 10 may be installed in contact with the zinc-based plated steel sheet 5, or they may be installed so as to be sandwiched between the upper die 8 and the lower die 9.

The spacers 10 may be constituted by thin metal plates attached to the surface of the lower die 9, or they may be formed by being carved from the surface of the lower die 9 by machining. The gap between the upper die 8 and the lower die 9, and therefore, the height of the indentations 5a-1 can be easily adjusted by, for example, attaching one or a plurality of spacers 10 of about 0.1 mm to the surface of the lower die 9.

The press working apparatus 20 shown in FIGS. 7 and 8 is equipped with spacers 10. However, if the compressive load is controlled, the height of the indentations 5a-1 can be controlled even if the spacers 10 are omitted. The compressive load in this case is determined by previous testing. The present inventors found from the relationship between the compression stroke and the load applied to a curved portion 5a that the load rapidly increases just before the curved portion 5a is completely compressed. Namely, just before complete compression, the effect of the load on a change in the height of an indentation 5a-1 is small, and the applied load abruptly increases just before complete compression. Therefore, the height of an indentation 5a-1 can be controlled by controlling the compressive load.

Figure 9:
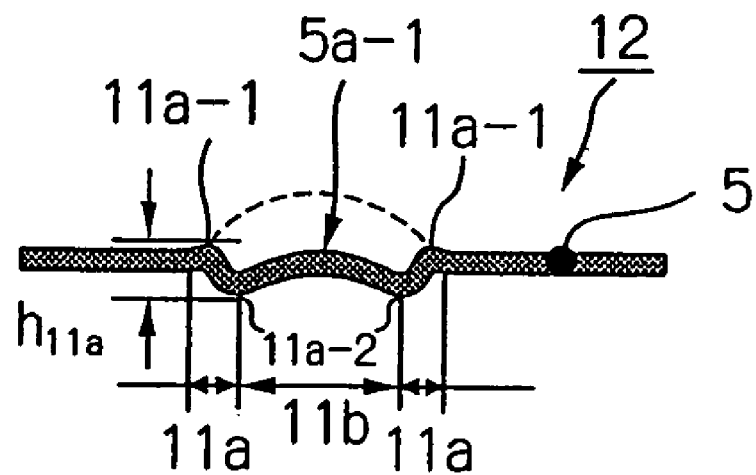
FIG. 9 is an explanatory view showing an example of the shape of an indentation formed in the second working step.

FIG. 9 is an explanatory view showing an example of the shape of an indentation 5a-1 formed by the second working step. This indentation 5a-1 is produced by carrying out embossing of a zinc-based plated steel sheet 5 to form a curved portion 5a and then carrying out press working so as to compress the curved portion 5a in the height direction. Therefore, as shown in FIG. 9, the indentation 5a-1 has an annular protruded portion 11a and a recessed portion 11b formed on the inside of the protruded portion 11a. The cross-sectional shape of the indentation varies in accordance with the thickness of the steel sheet or the height, diameter, shape, and the like of the curved portion formed by embossing. There are cases in which it has three or more peaks in an indentation, and a recessed portion or portions are formed on the inside thereof.

The height $h_{11a}$ of this indentation 5a-1, i.e., the distance between its two peaks 11a-1 and 11a-2 can be changed by suitably changing the thickness of the spacers 10 when using spacers 10 or by changing the compression load in the case in which spacers 10 are not used. As a result, the height $h_{11a}$ of the indentation 5a-1 can be adjusted so as to obtain a suitable gap for laser welding.

As described above, it is known that a suitable gap at the time of laser welding is at least 0.05 mm and at most 0.3 mm. More preferably, it is at least 0.07 mm and at most 0.2 mm. As shown in FIG. 9, an indentation 5a-1 which is formed in this embodiment has two peaks 11a-1 and 11a-2 on both surfaces of a zinc-based plated steel sheet 5. In order to guarantee a suitable gap, the height $h_{11a}$ of the indentation 5a-1 is preferably at least 0.02 mm and at most 1.0 mm.

The direction of the indentations 5a-1 which are formed in this embodiment varies with the thickness of the zinc-based plated steel sheet 5, the shape of the projections 4b provided on the lower die 4 used in the first working step, and the amount of compression in the second working step.

Figure 10:
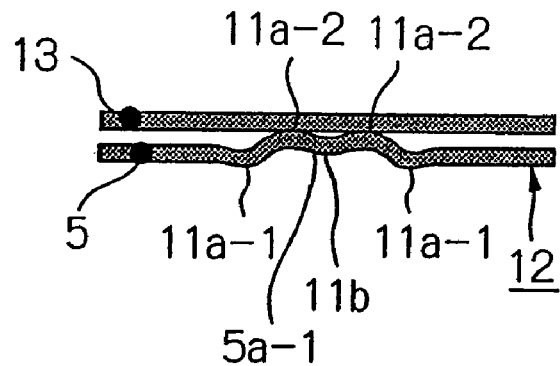
FIG. 10 is an explanatory view showing one example of the state in which a first material for laser welding and a second material for laser welding are superimposed.
Figure 11:
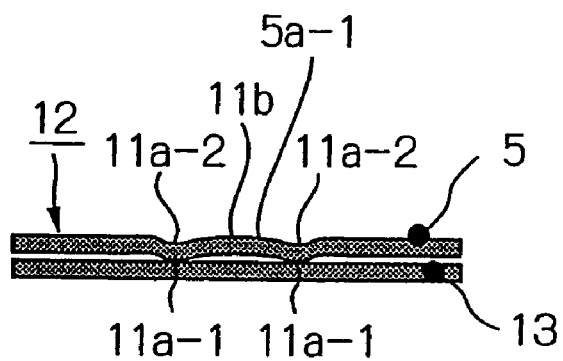
FIG. 11 is an explanatory view showing one example of the state in which a first material for laser welding and a second material for laser welding are superimposed.

When the protruded portion 11a of the indentation 5a-1 protrudes in the direction in which the curved portion 5a protrudes (upwards in this embodiment), as shown in FIG. 10, the member to which welding is to be performed, which is a common steel sheet or a zinc-based plated steel sheet 13, is disposed so as to be contacted by peak 11a-2 of the indentation, and the below-described laser welding can be carried out. On the other hand, when the protruded portion 11a of the indentation 5a-1 protrudes in the opposite direction from which the curved portion 5a protrudes (downwards in the present embodiment), as shown in FIG. 11, the member to which welding is to be performed, which is a common steel sheet or a zinc-based plated steel sheet 13, is disposed so as to be contacted by the peak 11a-1 of the indentation, and the below-described laser welding can be carried out. In general, when the thickness of the zinc-based plated steel sheet 5 is on the order of 0.7 mm and the height $h_{11a}$ of an indentation 5a-1 is at least 0.05 mm and at most 0.2 mm, the indentation 5a-1 is often formed so as to protrude in the opposite direction from the direction in which the projections 4b protrude.

Thus, in this embodiment, by the second working step, the second working step is performed on the convex curved portions which are formed by the first working step, or in other words, press working is carried out so as to compress the curved portions 5a which are formed by embossing. As a result, an annular protruded portion 11a having two peaks 11a-1 and 11a-2 and a recessed portion 11b which gives the plate the shape of a wave on the inside of the protruded portion 11a are formed in each indentation 5a-1.

[Material for Laser Welding 12]

Thus, in this embodiment, a material for laser welding 12 having a region 11 in which a plurality of indentations 5a-1 are formed and in which laser welding is carried out is manufactured. This material for laser welding 12 has a region 11 having a plurality of indentations 5a-1 each having an annular protruded portion 11a and a recessed portion 11b formed on the inside of the protruded portion 11a. In other words, this material for laser welding 12 is manufactured by performing embossing of a zinc-based plated steel sheet 5 to form curved portions 5a, and then performing press working to compress the curved portions 5a in the height direction.

In this material for laser welding 12, as described above, the height $h_{11a}$ of the protruded portions 11a of the indentations 5a-1 is preferably at least 0.02 mm and at most 1.0 mm.

[Method of Manufacturing a Laser Welded Article]

In this embodiment, as shown in FIG. 10 or FIG. 11, a first material for laser welding 13, which is a common steel sheet or a zinc-based plated steel sheet, and a second material for laser welding 12, which is a material for laser welding according to this embodiment, are superimposed such that peaks 11a-1 or 11a-2 of the protruded portions 11a of the indentations 5a-1 in a region 11 are disposed between the two sheets.

Then, laser welding is performed by irradiating a region in which a suitable distance for welding is guaranteed by the indentations 5a-1 of region 11, i.e., a region outside the protruded portion 11a or a region inside the recessed portion 11b, with a laser beam to manufacture a laser welded article.

Irradiation with the laser beam can be carried out from either the side on which the first material for laser welding 13 is located or the side on which the second material for laser welding 12 is located.

Thus, in the material for laser welding 12 of this embodiment, first a curved portion 5a is formed, and then the curved portion 5a is compressed in the height direction to form a region having indentations 5a-1. Accordingly, the height of the curved portions 5a can be made large enough to carry out working with certainty, and the problem of the prior art in which minute projections are used directly without modification to form a gap for laser welding, i.e., the problem that projections cannot be stably formed, can be completely solved.

In this embodiment, even when the curved portions 5a are provided in a curved surface of a zinc-based plated steel sheet 5, machining can be easily carried out for providing depressions 3b and projections 4b in the upper die 3 and the lower die 4, respectively, for forming the curved portions 5a, so a decrease in processing costs can be achieved.

The height $h_{11a}$ of the indentations 5a-1 in the region 11 in this embodiment is fully adequate to impart a suitable gap size, so the size of the gap undergoes almost no change even if the position at which laser welding is performed slightly moves, and the laser welding gap (distance) can be stably maintained.

In addition, in this embodiment, a minute gap of an arbitrary dimension can be easily maintained, so the degree of freedom of location of a clamping jig at the time of welding can be increased such that a wide area suitable for welding can be used.

Accordingly, according to this embodiment, the occurrence of weld defects can be prevented and a good weld can be obtained with certainty.

Second Embodiment

Next, a second embodiment will be explained. In the following explanations of each embodiment, the explanations will concentrate on features which differ from those in the above-described first embodiment, and a repeated explanation of portions which are common to both will omitted as appropriate.

As shown in below-described FIGS. 13(a) and 13(b), two galvannealed steel sheets 5 and 13 having a thickness of 0.7 mm (plating weight: 45 grams/mm$^2$) were superimposed, and laser welding was carried out to obtain a welded member 14. In this case, of these two galvannealed steel sheets 5 and 13 which are used, one of the steel sheets is, as described below, a steel sheet 5 having a region 11 with a plurality of indentations 15 which are formed by the below-described first working step and a second working step performed in succession prior to laser welding.

[First Working Step]

Figure 12:
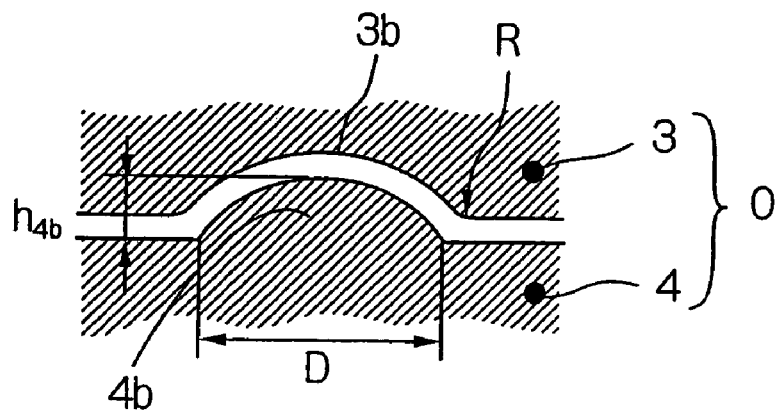
FIG. 12 is an enlarged cross-sectional view showing a depression and a projection of dies in a second embodiment.

FIG. 12 is an enlarged cross-sectional view showing a depression 3b and a projection 4b of dies in this embodiment. FIG. 13(a) is an explanatory view showing two steel sheets which are welded by this second embodiment, and FIG. 13(b) is an explanatory view showing a laminated steel sheet obtained by welding these two steel sheets. In FIG. 12, symbol D is the embossing diameter.

Using the embossing apparatus 0 which was explained while referring to FIG. 1, curved portions 5a were provided in a material to be worked in the form of a flat steel sheet 5. A plurality of projections 4b for forming the curved portions 5a were provided on the lower die 4 and a plurality of depressions 3b in positions opposing the projections 4b were provided in the upper die 3.

Figure 13A:
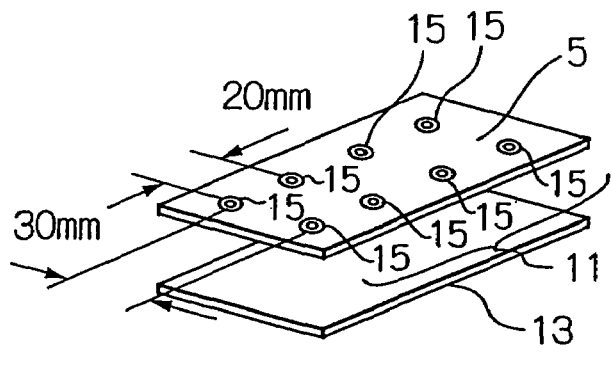
FIG. 13(a) is an explanatory view of two steel sheets which are welded in the second embodiment.
Figure 13B:
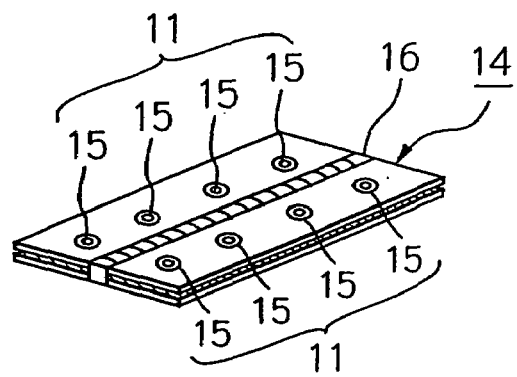
FIG. 13(b) is an explanatory view showing a laminated steel sheet formed by welding these two steel sheets.

As shown in FIG. 13(a), the projections 4b and the depressions 3b were disposed in two rows parallel to the expected weld line, the separation between the two rows was made 30 mm, and the separation between adjoining projections 4b or adjoining depressions 3b in the direction of the weld line was made 20 mm.

As shown in FIG. 12, the projections 4b provided in the lower die 4 had a circular shape. The diameter (embossing diameter) of the projections 4b was 6 mm. The tips of the projections 4b had a semispherical shape with a radius of curvature of 5 mm. The height $h_{4b}$ of the projections 4b was 2.0 mm. In addition, the radius of curvature (die R) of the corner portions of the depressions 3b provided in the upper die 3 was 1 mm. As a result of this first working step, a steel sheet 5 was obtained having curved portions 5a in two rows with a separation of 30 mm between the rows, a separation of 20 mm between adjoining curved portions 5a in the direction of the weld line, and a height of 2 mm.

[Second Working Step]

Next, using the press working apparatus 20 which is shown in FIG. 7 and which has an upper die 8 and a lower die 9, the curved portions 5a which were formed in the steel sheet 5 by the first working step were compressed to obtain a material for laser welding 12 having a region 11 with indentations 5a. In this embodiment, the orientation of the resulting indentations 15 formed in the steel sheet 5 was opposite from the orientation of the curved portions 5a extend.

The upper die 8 and the lower die 9 of the press working apparatus 20 were both planar. By providing spacers 10 on the lower die 9, the height of the indentations 15 was adjusted to be the separation between the upper die 8 and the lower die 9, which was made 0.8 mm (thickness of the material being worked plus 0.10 mm).

[Welding Step]

Figure 14:
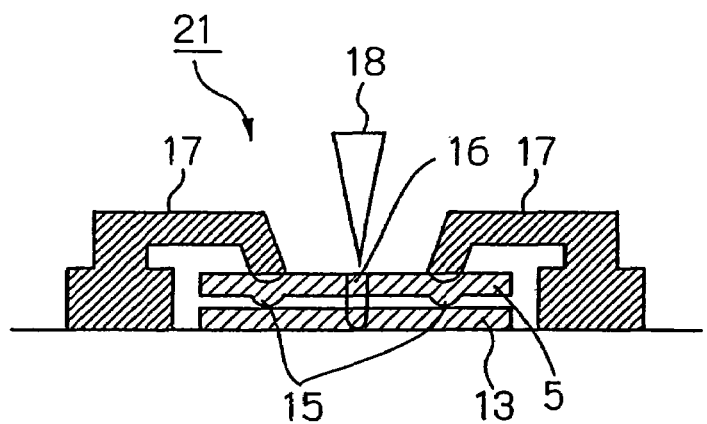
FIG. 14 is an explanatory view showing a laser welding apparatus used in the second embodiment.

Next, using the laser welding apparatus 21 shown in FIG. 14, a steel sheet 5 having a region 11 with indentations 15 was superimposed on a flat steel sheet 13. This steel sheet 5 was secured by a clamping jig 17. Then, laser welding was carried out by irradiating the top surface generally midway between the two rows of regions 11, which are disposed parallel to the direction of the weld line, with a laser beam 18. As shown in FIG. 14, superimposition of the steel sheets were made such that the convex surface of the indentations 15 formed on steel sheet 5 faces steel sheet 13. In FIG. 14, reference number 16 is a laser weld.

A lamp-excited Nd:YAG laser welding apparatus was used as the laser welding apparatus 21. The laser welding conditions were a continuous oscillation mode, an output of 3.0 kW, and a welding speed of 3.0 meters/minute, the focal point of the laser beam 18 was the surface of steel sheet 5, and argon was blown at the weld 16 at a rate of 20 liters/minute as a shielding gas for protecting the laser welding surface.

As a result, there was absolutely no occurrence of weld defects caused by vaporization of zinc from the zinc plating or surface defects such as collapse of the weld metal due to an overly large gap, and good welding was possible. It was confirmed that during irradiation with the laser beam, a gap of approximately of 0.1 mm was formed between steel sheet 5 and steel sheet 13 in the location where welding was performed.

Third Embodiment

A steel sheet 5 having a region 11 with indentations 15 was formed under the same conditions as in the first embodiment except that the region 11 having the indentations 15 was formed as a single row parallel to the weld line of a weld 16.

Figure 15A:
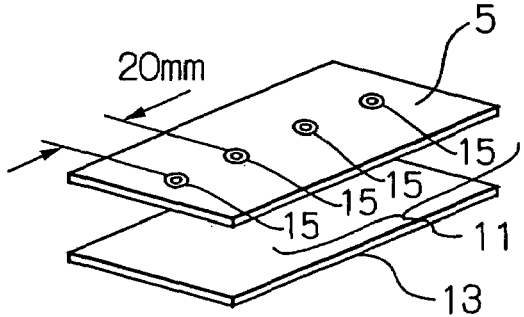
FIG. 15(a) is an explanatory view showing two steel sheets which are welded in a third embodiment.
Figure 15B:
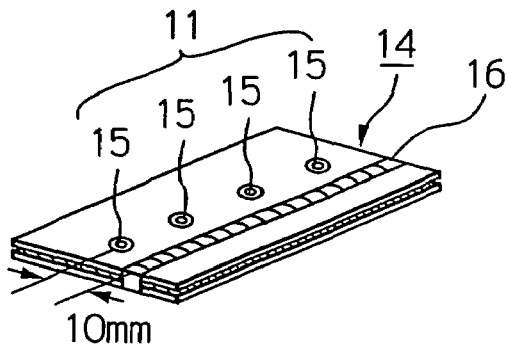
FIG. 15(b) is an explanatory view showing a laminated steel sheet formed by welding these two steel sheets.
Figure 16:
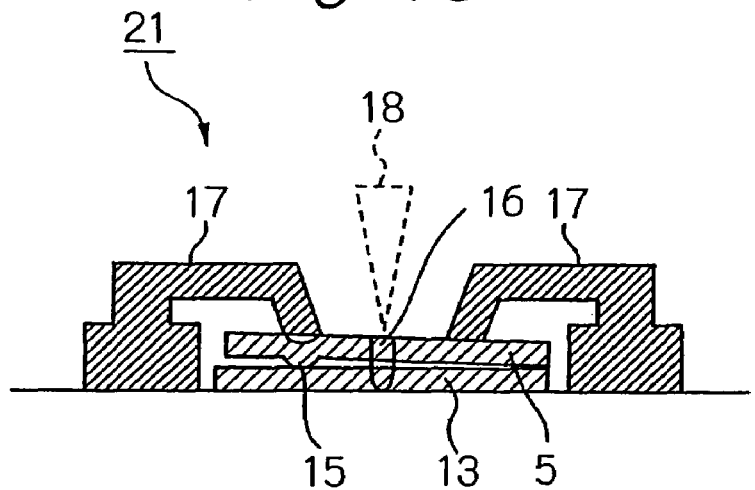
FIG. 16 is an explanatory view showing a laser welding apparatus used in the third embodiment.

Then, as shown in FIGS. 15(a), 15(b), and 16, the steel sheet 5 with the region 11 having indentations 15 was superimposed on a flat steel sheet 13, and a position spaced from the indentations 15 by 10 mm was irradiated with a laser beam to carry out laser welding. The spacing between adjoining indentations 15 in the direction of the resulting weld line was 20 mm. The welding conditions were the same as in the second embodiment.

As a result, there was absolutely no occurrence of weld defects caused by zinc evaporating from the zinc plating or surface defects such as collapse of the weld metal due to too large a gap, and good welding was possible. At the time of irradiation with the laser beam, it was confirmed that a gap of approximately 0.08 mm was formed between steel sheet 5 and steel sheet 13 in the welding location.

Fourth Embodiment

A steel sheet having a region with indentations 15 was formed by embossing followed by compression under the same conditions as in the third embodiment except that a single row of indentations 15 was formed parallel to the direction of the weld line of a weld 16 with the separation of 40 mm between adjoining indentations 15.

Figure 17A:
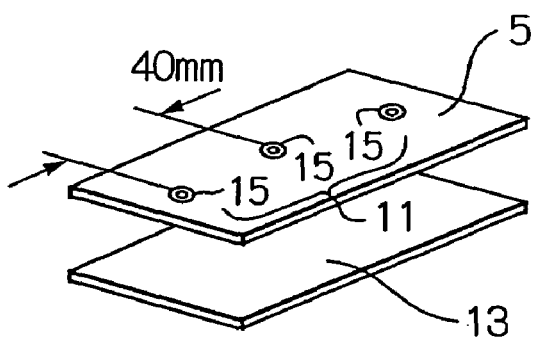
FIG. 17(a) is an explanatory view showing two steel sheets which are welded in a fourth embodiment.
Figure 17B:
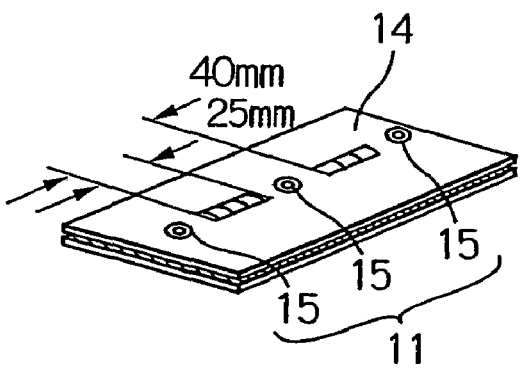
FIG. 17(b) is an explanatory view showing a laminated steel sheet formed by welding these two steel sheets.
Figure 18:
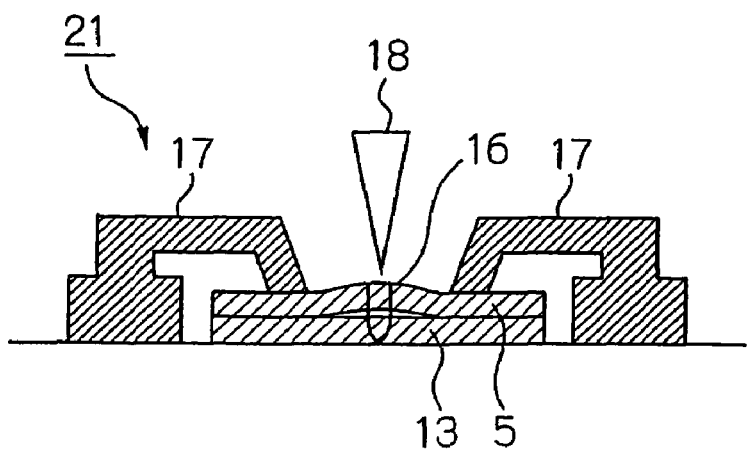
FIG. 18 is an explanatory view showing a laser welding apparatus used in the fourth embodiment.

Next, as shown in FIGS. 17(*a*), 17(*b*), and 18, the steel sheet 5 with the region 11 having the indentations 15 was superimposed on a flat steel sheet 13, and the areas between adjoining indentations 15 were irradiated with the laser beam 18 in such a manner that intermittent welding was carried out with a bead length of 25 mm. As a result, a gap of approximately 0.1 mm was formed in the welded region, weld defects due to zinc plating or collapse of weld metal did not occur, and good welding was possible.

Fifth Embodiment

In the explanation of the first through fourth embodiments, examples were given of the case in which two zinc-based plated steel sheets are laser welded. However, as in this embodiment, it is possible to stack and weld three or more zinc-based plated steel sheets.

Figure 19:
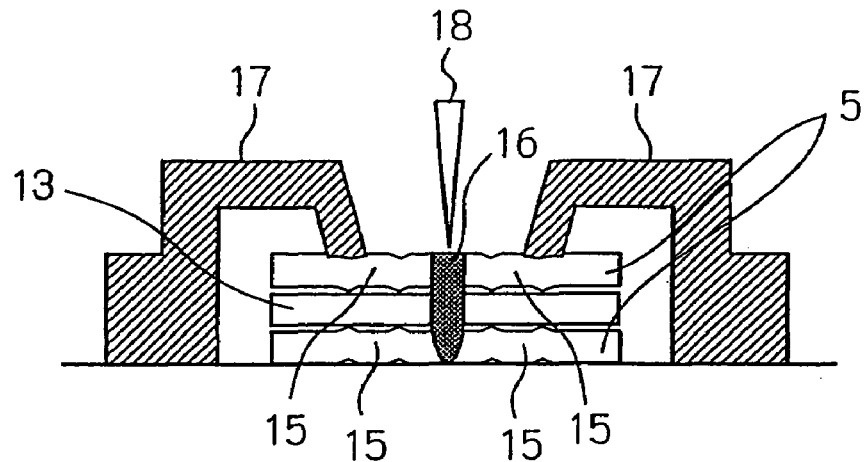
FIG. 19 is an explanatory view showing the case in which three zinc-based plated steel sheets are laser welded in a fifth embodiment.

FIG. 19 is an explanatory view showing the case in which three zinc-based plated steel sheets, 5, 13, and 5 are laser welded in this embodiment.

As shown in this figure, a flat member to be welded 13 was sandwiched between two zinc-based plated steel sheets 5 having regions 11 with a plurality of indentations 15, whereby a gap necessary for laser welding was formed between each of the steel sheets 5, 13, and 5, and laser welding was carried out by irradiation with a laser beam between the two rows of regions 11. As a result, good welding could be carried out.

Sixth Embodiment

In the explanation of the first through fifth embodiments, examples were given of the case in which two or three steel sheets having the same dimensions were completely superimposed and laser welding was carried out. However, as in this embodiment, two steel sheets can be stacked with their end surfaces displaced from each other, and the end portion of one steel sheet can be irradiated with a laser beam to perform fillet welding and weld it to the other steel sheet.

Figure 20:
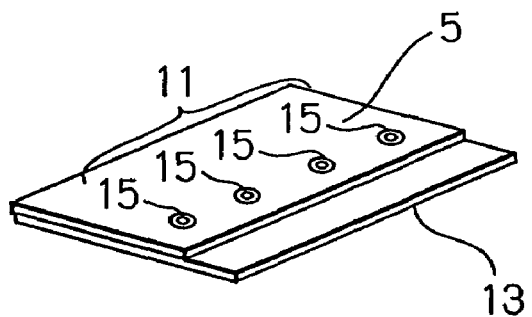
FIG. 20 is an explanatory view showing the state in which fillet welding is performed in a sixth embodiment.
Figure 21:
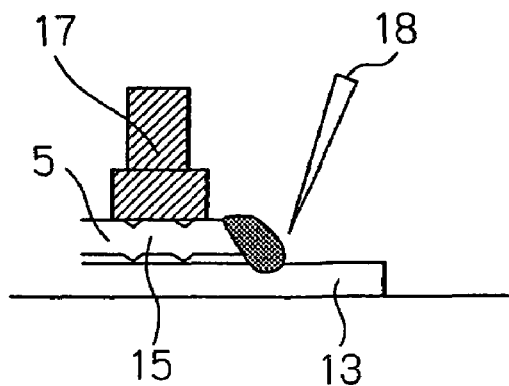
FIG. 21 is an explanatory view showing the state in which fillet welding is performed in the sixth embodiment.

FIG. 20 is an explanatory view showing the state in which fillet welding is carried out by this embodiment. In this case, a region 11 having indentations 15 can be provided in the vicinity of the end portion of at least one of steel sheets 5. As a result, as shown in FIG. 21, even if the steel sheet 5 is secured by a clamping apparatus 17, a gap is formed between steel sheet 5 and steel sheet 13 by the region 11 having indentations 15, so good laser welding can be carried out by the laser beam 18 without the welding being affected by components used in the surface treatment.

Seventh Embodiment

In contrast to the first through sixth embodiments, as is the case in this embodiment, the end portions of two or more steel sheets can be stacked up, and the stacked end portions can be irradiated with a laser beam and welded to carry out edge welding.

Figure 22:
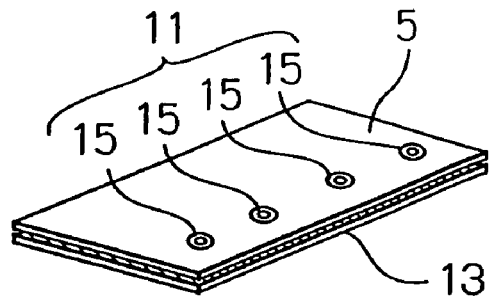
FIG. 22 is an explanatory view showing the state in which edge welding is performed in a seventh embodiment.
Figure 23:
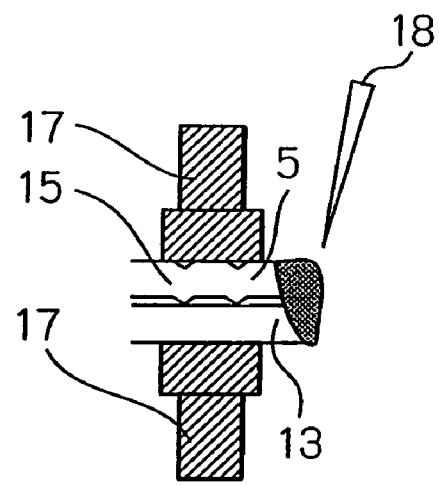
FIG. 23 is an explanatory view showing the state in which edge welding is performed in the seventh embodiment.

Namely, as shown in FIG. 22, a region 11 having indentations 15 can be provided in the vicinity of the end portion of at least one steel sheet 5. As a result, as shown in FIG. 23, even if steel sheets 5 and 13 are secured by a clamping apparatus 17, a gap is formed in region 11 between steel sheets 5 and 13, so good laser welding by a laser beam 18 can be carried out without the welding being affected by components in the coating formed by surface treatment.

Eighth Embodiment

Figure 24:
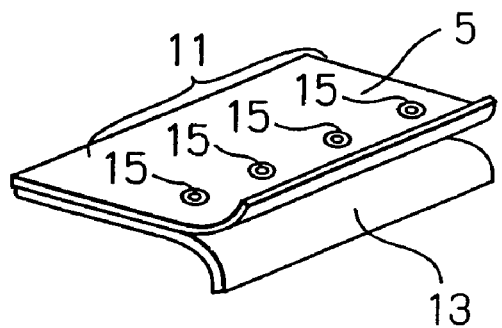
FIG. 24 is an explanatory view showing the state in which a flared joint is welded in an eighth embodiment.

In contrast to the first through seventh embodiments, FIG. 24 shows an example of a flared joint having a bevel-groove shape formed by two arcs or by an arc and a straight line.

Figure 25:
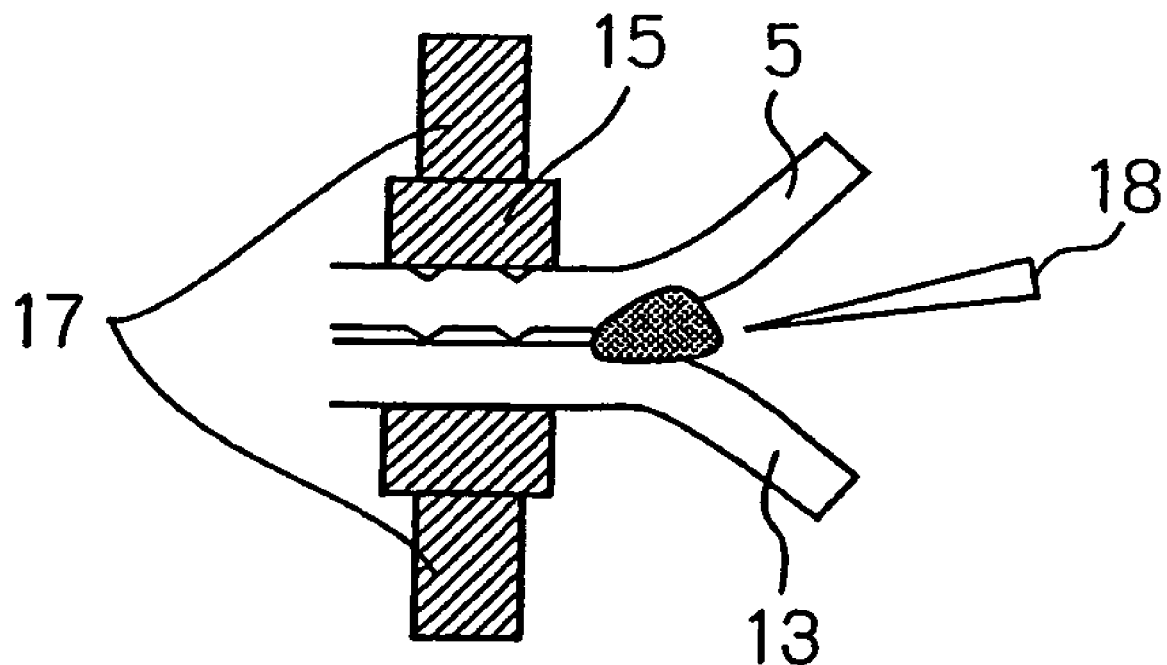
FIG. 25 is an explanatory view showing the state in which a flared joint is welded in the eighth embodiment.

Namely, as shown in FIG. 24, a region 11 having a row of indentations 15 can be provided on at least one steel sheet 5 of superimposed steel sheets in the vicinity of a flared end portion. As a result, as shown in FIG. 25, even if laser welding is carried out while securing steel sheets 5 and 13 by a clamping apparatus 17, a gap is formed between steel sheet 5 and steel sheet 13 by region 11, so good laser welding can be carried out by laser beam 18.

Ninth Embodiment

Figure 26C:
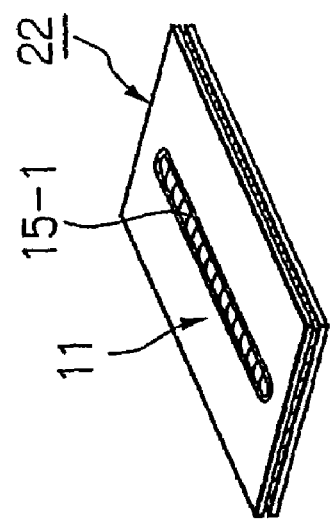
FIG. 26(c) is an explanatory view showing a laminated steel sheet obtained in the ninth embodiment.
Figure 26B:
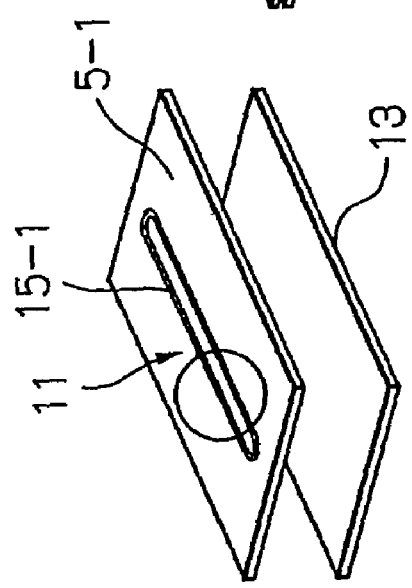
FIG. 26(b) is an explanatory view showing a zinc-based plated steel sheet having an indentation and a flat steel sheet which are welded in the ninth embodiment.
Figure 26A:
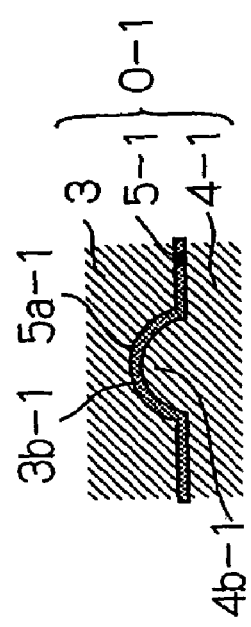
FIG. 26(a) is a cross-sectional view showing an embossing apparatus and a press working apparatus used in a ninth embodiment.

FIG. 26(*a*) is a cross-sectional view showing an embossing apparatus 0-1 and a press working apparatus 20-1 used in this embodiment. The upper view shows the formation of an embossed portion, and the lower view shows compression of the embossed portion. FIG. 26(*b*) is an explanatory view showing a zinc-based plated steel sheet 5-1 having an indentation 15-1 and a flat steel sheet 13 which are welded in this embodiment. FIG. 26(*c*) is an explanatory view showing a laminated steel sheet 22 obtained in this embodiment.

In each of the above-described embodiments, examples were given of the case in which the indentations 15 constituting a region 11 were in the form of at least two dot-shaped portions separated from each other and disposed generally parallel to the predicted welding position. In this embodiment, an indentation 15-1 which makes up a region 11 is provided in the form of a line extending generally parallel to the predicted welding position.

Namely, in this embodiment, as shown in FIG. 26(*a*), a depression 3*b*-1 is provided in an upper die 3-1 in the form of a line, and a projection 4*b*-1 which opposes the depression 3*b*-1 is provided in the form of a line on a lower die 4-1. By embossing using the embossing apparatus 0-1, a curved portion in the form of a line which extends generally parallel to the predicted welding position is formed in the zinc-based plated steel sheet 5.

By compressing this curved portion with the press working apparatus 20-1, a zinc-based plated steel sheet 5-1 is obtained having an indentation 15-1 which constitutes a region 11 and is in the form of a line extending generally parallel to the predicted welding position.

In this embodiment, as shown in FIG. 26(*c*), a suitable welding gap is maintained by superimposing this zinc-based plated steel sheet 5-1 and a flat steel sheet 13 with the indentation 15-1 therebetween, and a laminated steel sheet 22 is manufactured by irradiating the recessed portion formed on the inside of the indentation 15-1 with a laser beam to carry out laser welding, i.e., to carry out laser welding in the predicted welding position atop the indentation 15-1. As a result, in the same manner as in the first embodiment, it is ensured that laser welding can be carried out with certainty while a suitable welding gap is maintained. In laser welding, welding is carried out while pressing the vicinity of the weld with rollers or the like. When the position to be welded is in a recessed portion, there is the advantage that it is difficult to compress and crush the gap in the location irradiated by the laser with rollers or the like.

The location which is irradiated by the laser beam is not restricted to the recessed portion formed on the inside of the indentation 15-1, and as long as it is a position where a suitable welding gap can be maintained, it may be a position outside of the indentation 15-1, such as on one side or both sides of the indentation 15-1.

Tenth Embodiment

FIG. 27(*a*) is an explanatory view showing a second working step in this embodiment, FIG. 27(*b*) is an explanatory view showing a zinc-based plated steel sheet 5-2 having an indentation 15-2 and a flat steel sheet 13 which are welded in this embodiment, and FIG. 27(*c*) is an explanatory view showing a laminated steel sheet 23 obtained by this embodiment.

In the first through ninth embodiments, examples are given of the case in which a curved portion 5*a* is formed by a first working step in the form of embossing. However, in this embodiment, a steel sheet 5-2 having a curved portion 5*a*-2 formed by V-bending instead of by embossing is subjected to press working using a press working apparatus 20-1 to manufacture a zinc-based plated steel sheet 5-2 having a region 11 with an indentation 15-2.

Then, in the same manner as in the above-described ninth embodiment, by superimposing this zinc-based plated steel sheet 5-2 and a flat steel sheet 13 and performing laser welding, a laminated steel sheet 23 was manufactured.

As a result, in the same manner as in the ninth embodiment, a suitable welding gap is maintained with certainty, and laser welding can be carried out with certainty.

In this embodiment, the first working step comprises V-bending, so the curved portion 5*a*-2 can be formed with certainty and at a low cost, and working is easy. Therefore, the range of applications of the zinc-based plated steel sheet 5-1 can be increased.

Eleventh Embodiment

In the above-described tenth embodiment, a curved portion 5*a*-2 was formed in a steel sheet 5-2 by V-bending, but in this embodiment, a curved portion 5*a*-2 is formed in a steel sheet 5-2 not by V-bending but by L-bending, U-bending, a combination of U-bending and L-bending, drawing, or stepped drawing, and this curved portion 5*a*-2 undergoes compression by press working in a press working apparatus 20-1.

FIG. 28(*a*) is an explanatory view showing V-bending used in the tenth embodiment, and FIGS. 28(*b*), 28(*c*), 28(*d*), 28(*e*), and 28(*f*) are explanatory views showing L-bending, U-bending, a combination of U-bending and L-bending, drawing, and stepped drawing, respectively, in this embodiment.

In this specification, V-bending means bending a steel sheet into the shape of the letter V using a punch and die as shown in FIG. 28(*a*).

L-bending means bending a steel sheet into the shape of the letter L using a punch and die as shown in FIG. 28(*b*). U-bending means bending a steel sheet into the shape of the letter U using a punch, a die, and a pad as shown in FIG. 28(*c*). U-bending can also be performed without using a pad. A combination of U-bending and L-bending means working to form three bent portions using a punch and a die as shown in FIG. 28(*d*). It includes combined or draw-back forming to form a negative angle shape with respect to the direction of pressing by a cam mechanism. At this time, there are cases in which a single bent portion is formed, and there are cases in which three or more are formed.

Drawing means drawing a steel sheet inside a die using a punch, a die, and a blank holder as shown in FIG. 28(*e*). This is the working method which is most commonly used in forming automotive parts.

Finally, stepped drawing is a forming method in cushion drawing and double action drawing in which at least one step is formed in the region connecting the holding surface by a blank holder and the portion of a manufactured article.

FIGS. 29(*a*)-29(*d*) are explanatory views showing steps during the manufacture and welding of a steel sheet 5-2 using stepped drawing.

As shown in FIG. 29(*a*), an end portion of a steel sheet 5-2 is restrained by a die d and a holder h of a first working apparatus, drawing is carried out by a punch p and the die d to form a bent portion 5*a*-2. Next, as shown in FIG. 29(*b*), unneeded portions are cut off. Subsequently, a spacer s is disposed in a suitable position between a die d and a holder h of a second working apparatus, and the bent portion 5*a*-2 is compressed to form an indentation 15-2.

Thus, as shown in FIG. 29(*d*), by superimposing the steel sheet 5-2 in which the indentation 15-2 was formed and a steel sheet 13, restraining them with a roller jig (not shown), and irradiating the position shown by the arrow, for example, with a laser beam, steel sheet 5-2 and steel sheet 13 are laser welded.

Figure 30:
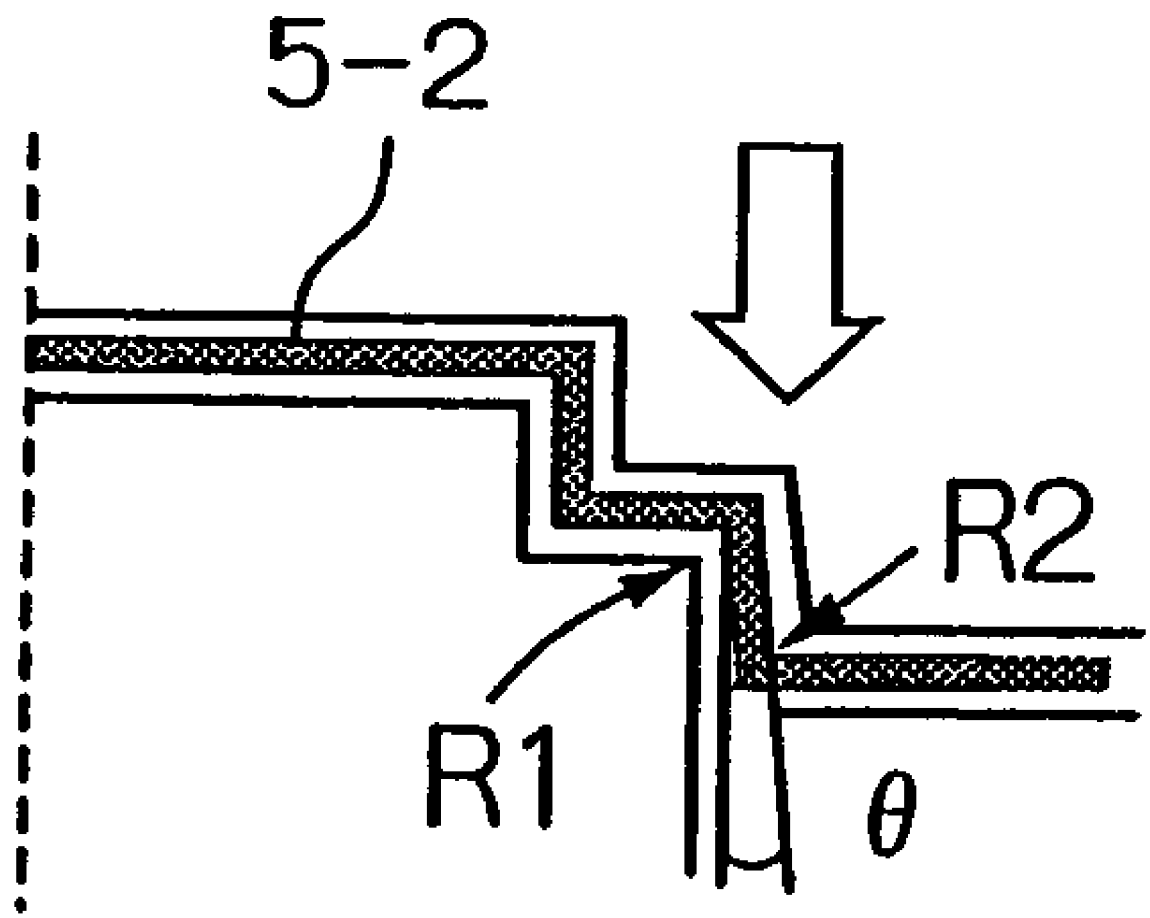
FIG. 30 is an explanatory view showing a die and a punch for carrying out drawing in the eleventh embodiment.

FIG. 30 is an explanatory view showing a die and a punch performing drawing.

In FIG. 30, if the step shoulder radius R1 and the die shoulder radius R2 are less than 1 mm, a large decrease in sheet thickness is produced at the time of drawing, and a decrease in the strength of the weld is produced. Therefore, the step shoulder radius R1 and the die shoulder radius R2 are both preferably at least 1 mm.

If the angle θ between the vertical portion of the step in stepped drawing and the direction of pressing at the time of compression is less than 2°, crushing can easily take place at the time of compression, so the angle θ is preferably at least 2°.

Stepped drawing is generally used in portions where the formation of cracks and wrinkles is predicted due to uneven inflow of material if drawing is carried out directly between the holding surface by a blank holder and the portion of a manufactured article. It is thought to be most practical in such applications where a press formed article is welded at its flange position.

Twelfth Embodiment

Materials for welding comprising a zinc-based plated steel sheet having indentations obtained by the above-described first through eleventh embodiments and materials for welding made from other steel sheets were assembled to form an automobile body by superimposing them with the indentations therebetween and performing laser welding.

In each of the above embodiments, any types of zinc-based plated steel sheets plated with a material having a boiling point which is lower than the melting point of steel such as an galvannealed steel sheet, a hot-dip galvanized steel sheet, or a zinc-nickel alloy plated steel sheet can be used as the zinc-based plated steel sheet. In addition, a steel sheet having an organic coating formed on a zinc-based plated steel sheet can be used.

In each of the above embodiments, a lamp-excited Nd:YAG laser is used for a laser welding apparatus which can be applied to laser welding. However, a semiconductorexcited Nd:YAG laser, a direct semiconductor laser, a carbon dioxide gas laser, or a laser welding apparatus combining these lasers can also be used. In addition, a hybrid laser which combines TIG, MIG, or a plasma may also be used.

FIGS. 31(a)-31(g) show a number of welded articles manufactured by a manufacturing method for welded articles according to the present invention. Below, these welded articles will be simply explained including those which have already been explained.

Figure 31A:
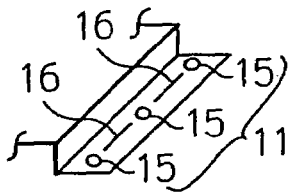
FIGS. 31(a)-31(j) are explanatory views of welded articles which are manufactured by a method of manufacturing welded articles according to the present invention.

The example shown in FIG. 31(a) is the welded article of above-described FIG. 16(b). In this example, a linear weld 16 is intermittently provided between a plurality of dot-shaped indentations 15 which are spaced from each other.

Figure 31F:
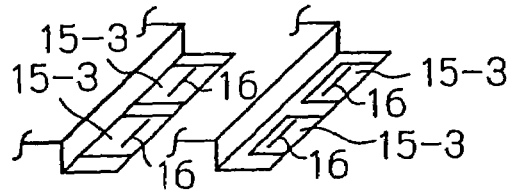
Figure 31B:
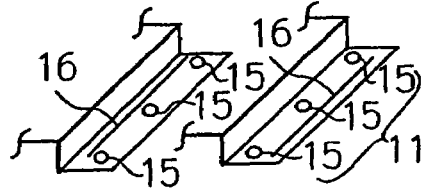

In the example shown in FIG. 31(b), a linear weld 16 is provided parallel to a plurality of dot-shaped indentations 15 which are spaced from each other.

Figure 31G:
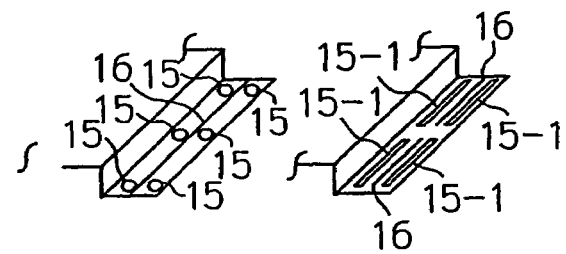
Figure 31C:
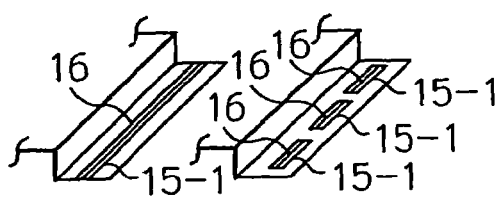

In the example shown in FIG. 31(c), a linear indentation or indentations 15-1 are provided so as to include a weld 16. As shown in the right view of FIG. 31(c), the indentations 15-1 and welds 16 may be intermittently formed.

Figure 31H:
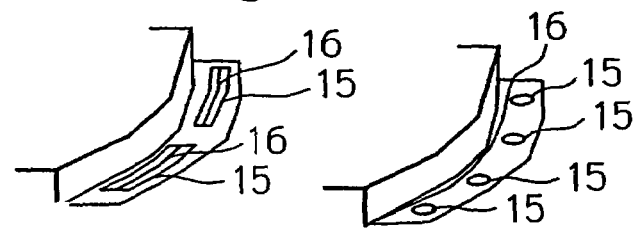
Figure 31D:
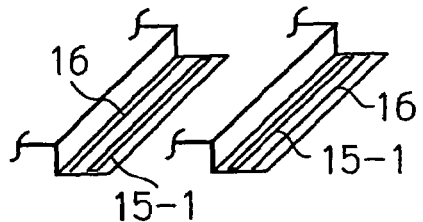

In the example shown in FIG. 31(d), a linear weld 16 is provided in the vicinity of and parallel to an indentation 15-1 of a linear form.

Figure 28A:
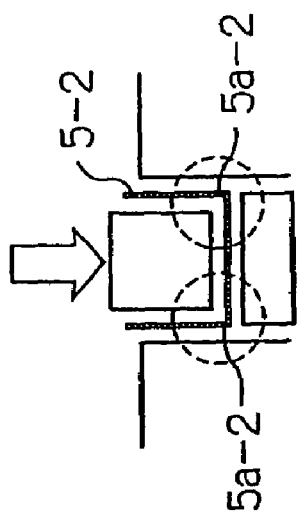
FIG. 28(a) is an explanatory view showing V-bending used in the tenth embodiment.
Figure 28B:
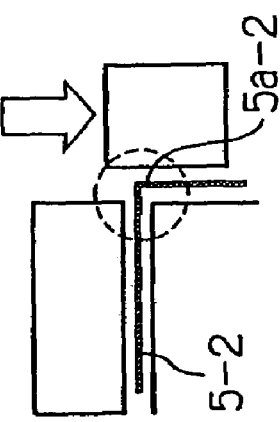
FIGS. 28(b), 28(c), 28(d), 28(e), and 28(f) are explanatory views respectively showing L-bending, U-bending, a combination of U-bending and L-bending, drawing, and stepped drawing in an eleventh embodiment.
Figure 28C:
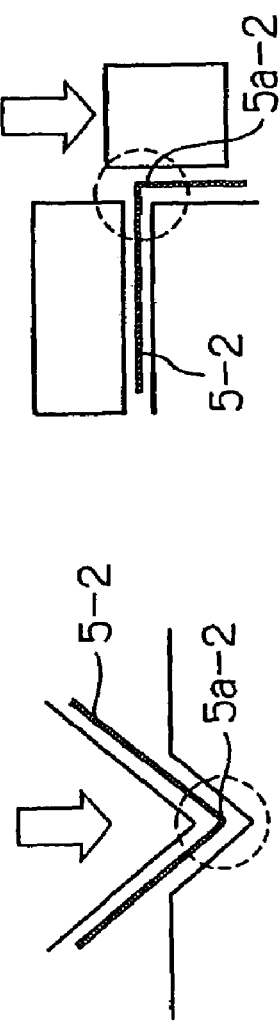
Figure 28D:
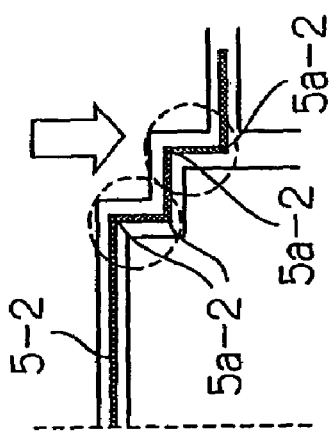
Figure 28E:
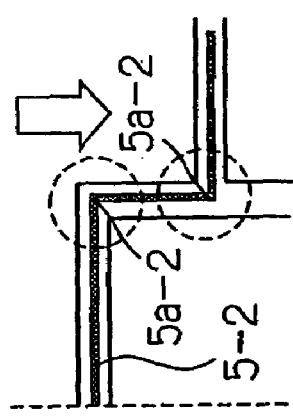
Figure 28F:
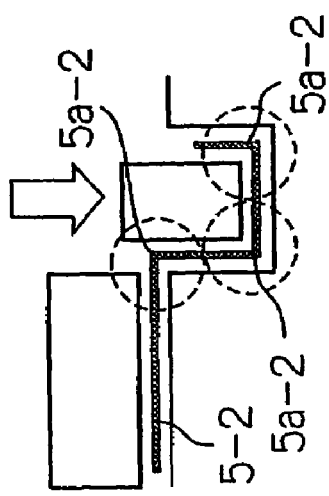
Figure 31I:
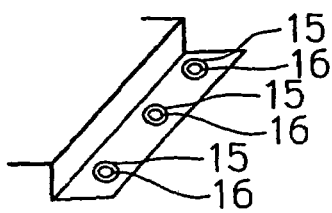
Figure 31E:
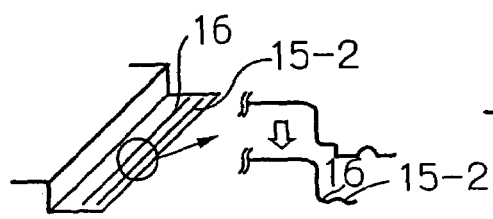

In the example shown in FIG. 31(e), after a curved portion is formed by the stepped drawing shown in FIG. 28(f), press working is performed on that portion to form a linear indentation 15-2, and then a weld 16 is provided in the vicinity of this indentation 15-2. This example is an example showing the above-described eleventh embodiment.

The example shown in FIG. 31(f) is a case in which one or more planar indentations 15-3 are formed so as to include an expected weld portion (weld) 16. In this example as well, each indentation 15-3 can be used as a region.

FIG. 31(g) shows an example in which dot-shaped indentations 15 or linear indentations 15-1 are formed into two rows in a total of 6 locations, and a location between the two rows of indentations 15 or indentations 15-1 is irradiated with a laser beam.

The example shown in FIG. 31(h) is an example of application to a portion having a curvature. Weld lines 16 having a curvature are provided in each region inside an indentation 15 having a curvature. Alternatively, a plurality of dot-shaped indentations are provided along a curve, and a weld line 16 is provided in the vicinity of the indentations.

In the example shown in FIG. 31(i), annular welds 16 are provided so as to encompass dot-shaped indentations 15.

Figure 31J:
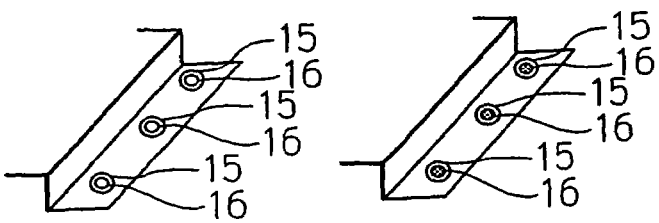

In the example shown in FIG. 31(j), a weld of an annular shape or a flat circular shape is provided in each region inside an indentation 15.

Thirteenth Embodiment

Figure 32:
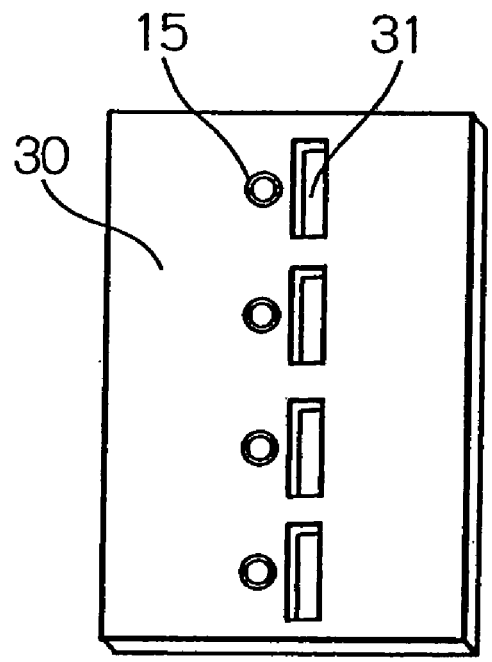
FIG. 32 is an explanatory view showing the shape of a material for welding in which an indentation is formed according to the first embodiment.
Figure 33:
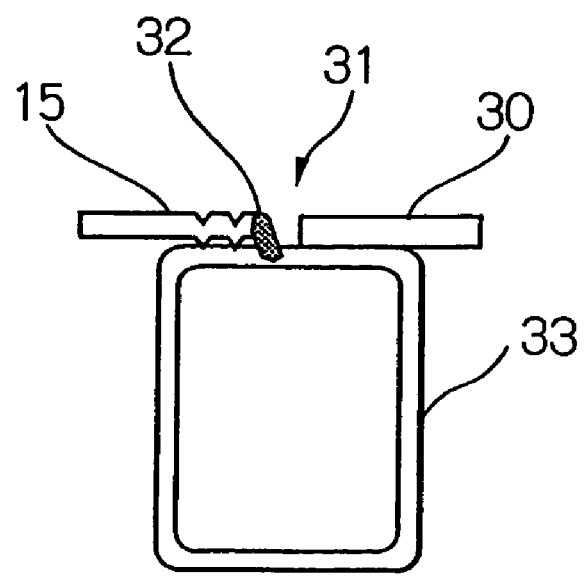
FIG. 33 is a cross-sectional view showing the state in which a material for welding and another material for welding are arc welded in a thirteenth embodiment.

FIG. 32 is an explanatory view showing the shape of a material for welding 30 in which indentations 15 shown in the above-described first embodiment are formed, and FIG. 33 is a cross-sectional view showing the state in which this material for welding 30 is arc welded to another material for welding 33.

As shown in FIG. 32, this material for welding 30 is a part for an automobile body. Four welding holes 31 are provided in a straight line parallel to a row of four indentations 15 which are arranged in a straight line.

This material for welding 30 is arc welded to the other member for welding 33 such as a hydroformed pipe or other structural member with a closed cross section by arc welding utilizing the four welding holes 31 by forming an arc weld 32 between them.

As shown in FIG. 33, in this example, a suitable welding gap between material for welding 30 and the other material for welding 33 can be easily guaranteed by the indentations 15, so defects resulting from plated coating can be prevented, and good arc welding can be carried out.

Fourteenth Embodiment

In the explanation of the thirteenth embodiment, an example was given of a case in which the present invention was applied to a part for an automobile body, but this example is the case of application to a building material.

Figure 34:
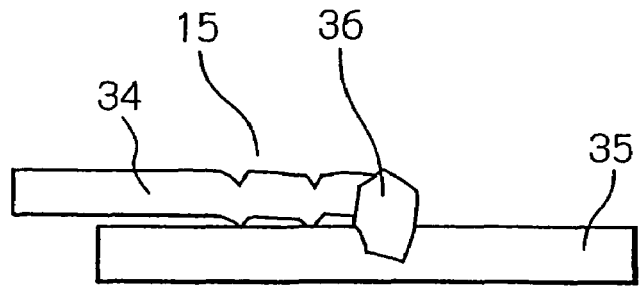
FIG. 34 is an explanatory view showing an example of the basic structure when the present invention is applied to building materials.

FIG. 34 is an explanatory view showing an example of the basic structure of a case in which the present invention is applied to a building material. As shown in this figure, a material for welding 34 having indentations 15 in the vicinity of one of its edges and another material for welding 35 are superimposed with the indentations 15 disposed between them, and arc welding is carried out in the edge portion of material for welding 34 to form a fillet welded joint 36. The material for welding 34 and the material for welding 35 are each required to have corrosion resistance, so they are materials for welding for building materials using zinc-based plated steel sheet.

As shown in FIG. 34, in this example as well, a suitable welding gap between material for welding 34 and the other material for welding 35 can be easily guaranteed by the indentations 15, and arc welding can be carried out while preventing defects arising from plated coating.

Figure 35A:
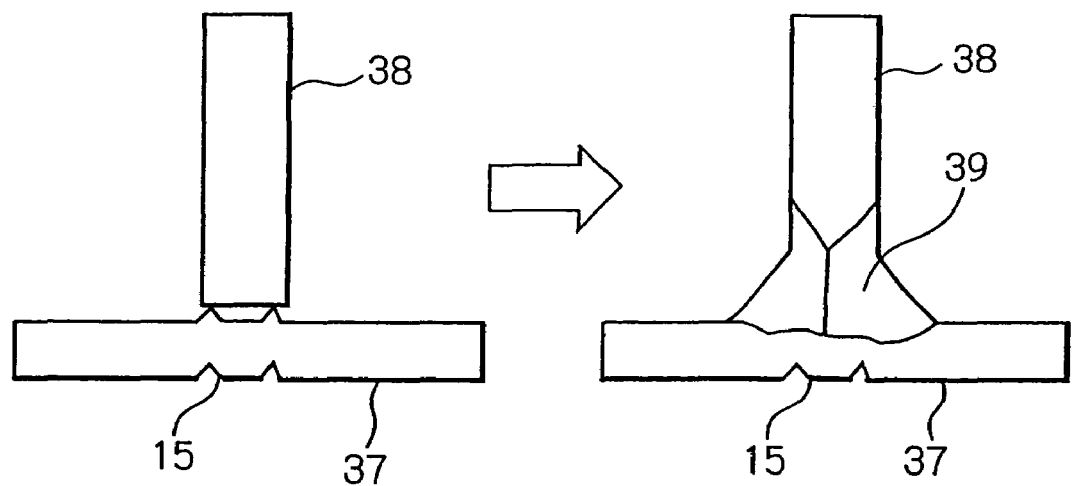
FIG. 35(a) is a cross-sectional view showing the state in which the present invention is applied to another building material to form a T-shaped welded joint.
Figure 35B:
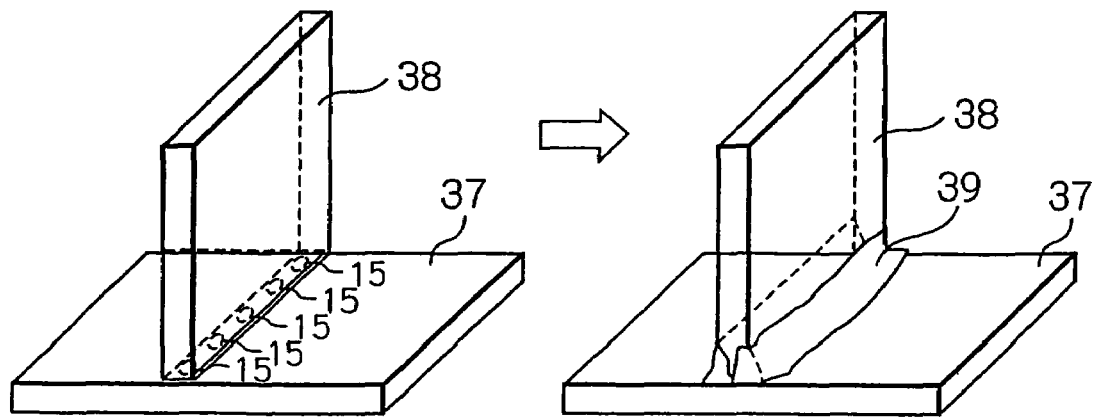
FIG. 35(b) is a perspective view showing the state in which the present invention is applied to another building material to form a T-shaped welded joint.

FIG. 35(a) is a cross-sectional view showing the state in which the present invention is applied to another building material to form a T-shaped welded joint 39. FIG. 35(b) is a perspective view showing the state in which the present invention is applied to another building material to form a T-shaped welded joint 39. As shown in FIGS. 35(a) and 35(b), a material for welding 37 having dot-shaped indentations 15 and another material for welding 38 are superimposed with the indentations 15 therebetween, and a T-shaped welded joint 39 is formed where the materials for welding 37 and 38 abut. Material for welding 37 and material for welding 38 are both materials for welding for building materials using zinc-based plated steel sheet.

As shown in FIGS. 35(a) and 35(b), in this example as well, a suitable welding gap between material for welding 37 and the other material for welding 38 can be easily guaranteed by indentations 15, and arc welding can be carried out while preventing defects caused by plated coating.

Thus, the present invention can be applied not only to parts for automobile bodies but also to building materials, and as a result, it contributes to an improvement in weld quality.

Fifteenth Embodiment

In the above-described first through fourteenth embodiments, examples were given of the case in which the indentations 15 provided in a region for guaranteeing a prescribed gap size have, as shown, for example, in FIG. 9 and the like, a shape constituted by a protruded portion 11a and a recessed portion 11b which is formed on the inside of the protruded portion 11a.

Depending upon the embossed diameter, the thickness of the steel sheet, and the like, there are cases in which this indentation 15 has a protruded shape constituted by a single projection on the embossed side of the sheet, i.e., it has a shape constituted merely by a single protruded portion. In general, when the sheet thickness is relatively small with respect to the embossed diameter, the indentation can easily become a shape constituted by a protruded portion 11a and a recessed portion 11b formed on the inside of the protruded portion 11a. Conversely, when the sheet thickness is large with respect to the embossed diameter, it can easily become a shape constituted by a single protruded portion.

In the explanation of this embodiment, an explanation will be given with respect to an indentation having a shape constituted by a single protruded portion, and elements other than this shape and the effects of the indentation are the same as those for the above-described first through fourteenth embodiments, so a repeated explanation will be omitted.

Figure 36:
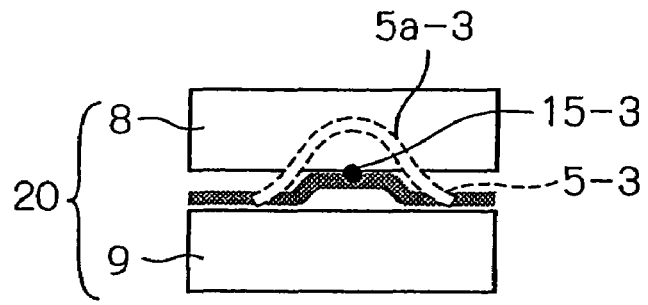
FIG. 36 is an explanatory view schematically showing the case in which an indentation having a shape formed from one protruded portion is formed on a zinc-based plated steel sheet.
Figures 37A, 37B:
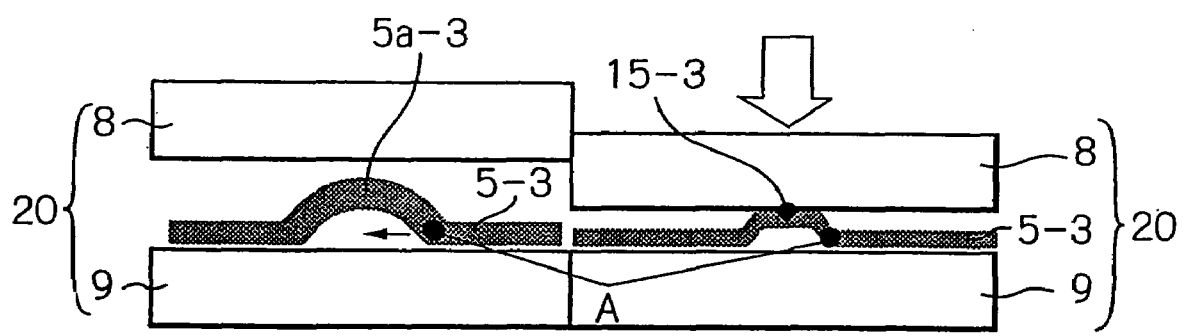
FIGS. 37(a) and 37(b) are each explanatory views showing the state of deformation of a zinc-based plated steel sheet during the second working step in a fifteenth embodiment.

FIG. 36 is an explanatory view schematically showing the state of forming an indentation 15-3 having a shape constituted by a single protruded portion in a zinc-based plated steel sheet 5-3 by a second working step. FIGS. 37(a) and 37(b) are explanatory views showing the state of deformation of the zinc-based plated steel sheet 5-3 in this second working step.

As shown in FIGS. 36, 37(a), and 37(b), if, for example, a first working step (embossing) is carried out on a zinc-based plated steel sheet 5-3 having a large thickness relative to an embossed diameter to form a curved portion 5a-3, and a second working step (pressing) is carried out to compress the curved portion 5a, as shown in FIGS. 36 and 37(b), an indentation 15-3 is formed which has a shape constituted not by a protruded portion and a recessed portion formed on the inside of the protruded portion but instead constituted by a single protruded portion.

As shown in FIG. 37(a), it is thought that the indentation 15-3 takes on a shape constituted by a single protruded portion as a result of the base part A of the curved portion 5a-3 of the embossed shape formed by the first working step being moved towards the center (in the direction of the arrow) due to compression by the second working.

Figure 38:
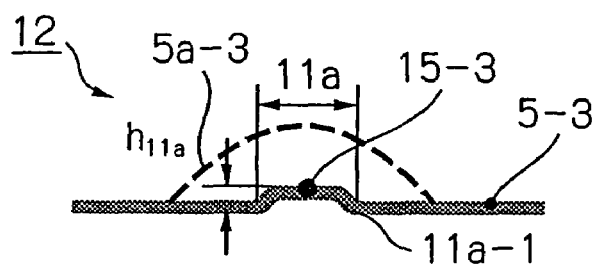
FIG. 38 is an explanatory view showing in detail an example of the shape of an indentation formed in the fifteenth embodiment.
Figure 39A:
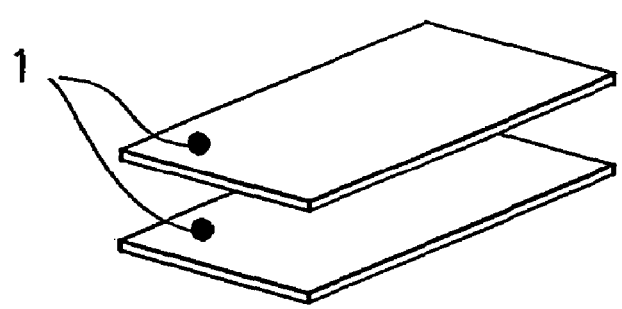
FIGS. 39(a) and 39(b) are each explanatory views showing the state in which a laminated steel sheet is manufactured from zinc-based plated steel sheets.
Figure 39B:
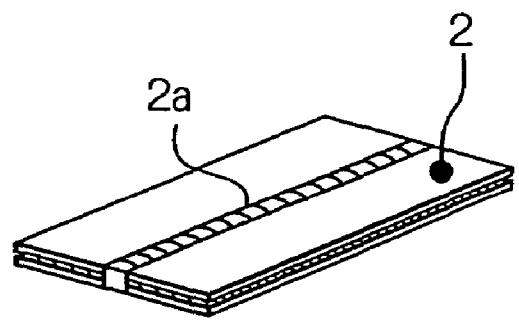

FIG. 38 is an explanatory view showing the details of an example of the shape of an indentation 15-3 formed in this manner.

This indentation 15-3 is produced by performing the first working step (embossing) on a zinc-based plated steel sheet 5-3 to form a curved portion 5a-3, and then carrying out the second working step (pressing) to compress the curved portion 5a-3 in the height direction. This indentation 15-3 remains on the same side of the curved portion after the second working step in such a manner that the height by which it projects and its diameter are both reduced compared to the curved portion, and a flat peak 11a-3 is formed.

Whether the indentation has a shape constituted by a protruded portion and a recessed portion formed on the inside of the protruded portion or whether it has a shape constituted by a single protruded portion is influenced by the thickness of the zinc-based plated steel sheet which is the material being worked, and the height, the diameter, the shape, and the like of the embossed portion. In some cases, a plurality of recessed portions appears inside a protruded portion. The shape is not limited to a shape described in the present specification.

Even when the indentation has a shape constituted by a single protruded portion as described above, the same effects can be provided as with an indentation shown in the first through fourteenth embodiments having a shape constituted by a protruded portion and a recessed portion formed on the inside of the protruded portion.

INDUSTRIAL APPLICABILITY

In accordance with the present invention, a material for welding, a welded article, and an automobile body, for example, a material for laser welding, a laser welded article, and an automobile body, can be provided which can prevent the occurrence of weld defects and obtain a good weld with certainty.

The invention claimed is:

1. A method of forming a protrusion in a first material for welding purposes, one or more portions of the protrusion adapted to form a gap when the first material is superimposed on a second material that is adapted to be welded to the first material, the method comprising:
    forming at least one curved portion in the first material; and
    compressing the curved portion to form the protrusion having a height to guarantee gap by press working in advance of superimposing for welding, wherein the forming step is performed in a first direction and the compressing step is formed in a direction opposite to the first direction.

2. The method of claim 1, wherein the curved portion has a convex shape.

3. The method of claim 1, wherein the forming step further comprising placing the first material between a set of dies, with one die having at least one projection, and the other die having at least one recess, the recess aligned with the projection.

4. The method of claim 1, wherein the compressing step comprises placing the first material with the curved portion between a pair of dies, the dies separated by a plurality of spacers.

5. The method of claim 1, wherein the forming step is performed in a first direction and the compressing step is performed in a direction opposite the first direction.

6. The method of claim 5, wherein the curved portion is formed with a first height greater than said height created in the compressing step.

7. The method of claim 1, wherein the curve portion is formed with a first height greater than said height created in compressing step.

8. A method of welding two materials together, the method comprising:
    forming at least one curved portion in a first material, wherein the forming step is performed in a first direction; and
    compressing the curved portion to form a protrusion by press working, wherein the compressing step is in a direction opposite the first direction;
    superimposing the first material with the protrusion to a second material, the protrusion disposed between the first and second materials; and
    welding the first and second materials.

9. The method of claim 8, wherein the welding is one of one of laser, plasma or arc welding.

10. The method of claim 8, wherein the two materials are components of an automobile body.

* * * * *